United States Patent
Mullet et al.

(10) Patent No.: US 12,123,457 B2
(45) Date of Patent: Oct. 22, 2024

(54) SPLICE CONNECTOR SYSTEM FOR ARCHITECTURAL COVERING SUPPORT RODS

(71) Applicant: Current Products Corp., Pensacola, FL (US)

(72) Inventors: Willis J. Mullet, Pensacola, FL (US); Scott Hand, Pensacola, FL (US); Jon Smidt, Pensacola, FL (US); Phillip Dugger, Pensacola, FL (US)

(73) Assignee: CURRENT PRODUCTS COMPANY, LLC, Pensacola, FL (US)

( * ) Notice: Subject to any disclaimer, the term of this patent is extended or adjusted under 35 U.S.C. 154(b) by 624 days.

(21) Appl. No.: 17/332,320

(22) Filed: May 27, 2021

(65) Prior Publication Data

US 2021/0381537 A1 Dec. 9, 2021

Related U.S. Application Data

(60) Provisional application No. 63/034,018, filed on Jun. 3, 2020.

(51) Int. Cl.
*A47H 13/02* (2006.01)
*A47H 1/02* (2006.01)
(Continued)

(52) U.S. Cl.
CPC ............. *F16B 7/0413* (2013.01); *A47H 1/02* (2013.01); *A47H 5/06* (2013.01); *A47H 13/02* (2013.01); *A47H 2001/0215* (2013.01)

(58) Field of Classification Search
CPC .......... A47H 5/06; A47H 5/02; A47H 5/0325; A47H 2001/0215; A47H 13/02;
(Continued)

(56) References Cited

U.S. PATENT DOCUMENTS

D5,178 S    12/1871   Gould
288,231 A   11/1883   Grimmett
(Continued)

FOREIGN PATENT DOCUMENTS

GB    2382764       6/2003
JP    2006304984    11/2006
(Continued)

OTHER PUBLICATIONS

"Cordoba" drapery rod offered by Forest Drapery Hardware, of 2500 Donn Drive, Cartersville GA 30120; Jul. 19, 2021.
(Continued)

*Primary Examiner* — Abe Massad
(74) *Attorney, Agent, or Firm* — BrownWinick Law Firm; Christopher A. Proskey

(57) ABSTRACT

In one or more embodiments, a drapery system is presented including a drapery support rod having a plurality of segments joined by one or more splice connectors. The splice connector includes a first section, a stop at an intermediate point, and a second section. The first and second sections include features configured and arranged to engage and connect with interior surfaces of the first and second segments, thereby operably connecting the first and second segments of the drapery support rod. The drapery support rod includes a helical guide structure on the exterior surface to move one or more of a plurality of ring members between an open and closed position, wherein the rings are configured and arranged to attach to an upper edge of a shade material and suspend the shade material from the drapery support rod.

26 Claims, 20 Drawing Sheets

(51) Int. Cl.
*A47H 5/06* (2006.01)
*F16B 7/04* (2006.01)

(58) Field of Classification Search
CPC .......... A47H 1/02; A47H 1/022; A47H 1/142; A47H 23/00; E06B 2009/407; F16B 7/0413
See application file for complete search history.

(56) References Cited

U.S. PATENT DOCUMENTS

| | | | |
|---|---|---|---|
| 346,752 A | 12/1886 | Hinternesch | |
| D22,271 S | 3/1893 | Ruxton | |
| 537,681 A | 4/1895 | Furbish | |
| D25,521 S | 5/1896 | Ili | |
| 785,517 A | 3/1905 | Paeth | |
| D41,567 S | 7/1911 | Strassburger | |
| 1,339,353 A | 5/1920 | Kimber | |
| 1,509,620 A | 9/1924 | Taylor | |
| 1,723,970 A * | 8/1929 | Jauch | B66F 3/08 |
| | | | 248/354.3 |
| 1,812,881 A | 7/1931 | Kirsch | |
| 1,823,909 A | 9/1931 | Meier | |
| 1,954,941 A | 4/1934 | Monnier | |
| 2,135,647 A | 11/1938 | Streby | |
| 2,256,008 A | 9/1941 | Armstrong | |
| 2,293,168 A * | 8/1942 | Pirone | A47H 1/022 |
| | | | 211/105.4 |
| 2,538,755 A | 1/1951 | Bradley | |
| 2,616,499 A | 11/1952 | Eckles | |
| 2,674,307 A | 4/1954 | Calmy | |
| 2,703,724 A * | 3/1955 | Der Yuen | F16B 7/182 |
| | | | 403/44 |
| 2,801,690 A | 8/1957 | Bennett | |
| 2,807,322 A | 9/1957 | Toti | |
| 2,846,079 A | 8/1958 | Leeper | |
| 3,003,552 A | 10/1961 | Eilenberger | |
| 3,045,747 A | 7/1962 | Hill | |
| 3,095,033 A | 6/1963 | Polkosnik | |
| 3,115,181 A | 12/1963 | Snyder | |
| 3,208,507 A | 6/1965 | Breen | |
| 3,333,622 A | 8/1967 | Graber | |
| 3,521,694 A * | 7/1970 | Anderson | E06B 9/44 |
| | | | 160/323.1 |
| 3,561,520 A | 2/1971 | Gill | |
| 3,656,358 A | 4/1972 | Kopp | |
| 3,661,272 A * | 5/1972 | Di Panni, Jr. | A47H 1/02 |
| | | | 248/251 |
| 3,774,665 A | 11/1973 | Bourne | |
| 4,023,609 A | 5/1977 | Rosenquist | |
| 4,160,972 A | 7/1979 | La Mell | |
| 4,171,845 A | 10/1979 | Hirsch | |
| 4,305,448 A | 12/1981 | Stroll | |
| 4,335,775 A | 6/1982 | Frentzel | |
| 4,492,262 A | 1/1985 | Comeau | |
| 4,657,059 A | 4/1987 | Clauss | |
| 4,662,775 A * | 5/1987 | Faul | B62D 1/10 |
| | | | 74/552 |
| 4,724,885 A | 2/1988 | Chang | |
| 4,759,398 A | 7/1988 | Renee | |
| 4,773,464 A | 9/1988 | Kobayashi | |
| 4,819,708 A | 4/1989 | Onosato | |
| 4,827,199 A | 5/1989 | Kaucic | |
| 4,832,104 A | 5/1989 | De Labarthe | |
| 4,878,528 A | 11/1989 | Kobayashi | |
| 4,926,922 A | 5/1990 | Shimazaki | |
| 4,951,730 A | 8/1990 | Hsu | |
| 4,958,112 A | 9/1990 | Zerillo | |
| D315,415 S | 3/1991 | Anthony et al. | |
| D324,328 S | 3/1992 | Pagan | |
| D324,645 S | 3/1992 | Magro et al. | |
| 5,149,149 A * | 9/1992 | Wu | F16B 7/0413 |
| | | | 403/348 |
| 5,301,733 A | 4/1994 | Toti | |
| D355,353 S | 2/1995 | Pozzi | |
| D355,587 S | 2/1995 | Pozzi | |
| 5,398,900 A | 3/1995 | Schober | |
| 5,412,553 A | 5/1995 | Wojski | |
| 5,413,161 A | 5/1995 | Corazzini | |
| 5,419,010 A | 5/1995 | Mullet | |
| 5,467,808 A | 11/1995 | Bell | |
| 5,517,094 A | 5/1996 | Domel | |
| 5,540,269 A | 7/1996 | Plumer | |
| 5,676,189 A | 10/1997 | Zeeb | |
| D391,476 S | 3/1998 | Gourlay | |
| 5,760,558 A | 6/1998 | Popat | |
| 5,793,174 A | 8/1998 | Kovach | |
| 5,889,377 A | 3/1999 | Mao | |
| 5,899,255 A | 5/1999 | Petracini | |
| 5,975,187 A | 11/1999 | Chou | |
| 5,990,646 A | 11/1999 | Kovach | |
| 6,004,298 A | 11/1999 | Levander | |
| D418,741 S | 1/2000 | Rouse | |
| 6,024,156 A | 2/2000 | Chu | |
| 6,060,852 A | 5/2000 | Domel | |
| 6,062,290 A | 5/2000 | Domel | |
| 6,085,826 A | 7/2000 | Maesaki | |
| 6,116,320 A | 9/2000 | Peterson | |
| 6,125,909 A | 10/2000 | Walker | |
| 6,152,205 A | 11/2000 | Toti | |
| 6,201,364 B1 | 3/2001 | Will | |
| 6,215,265 B1 | 4/2001 | Wolfer | |
| 6,371,192 B1 | 4/2002 | Anderson | |
| 6,405,782 B1 | 6/2002 | Cheng | |
| 6,433,498 B1 | 8/2002 | Domel | |
| 6,441,575 B1 | 8/2002 | Peterson | |
| 6,446,693 B1 | 9/2002 | Anderson | |
| 6,497,267 B1 | 12/2002 | Azar | |
| 6,603,644 B2 | 8/2003 | Yeh | |
| 6,688,368 B2 | 2/2004 | Kovach | |
| 6,736,186 B2 | 5/2004 | Anderson | |
| 6,827,121 B2 | 12/2004 | Park | |
| 6,850,017 B1 | 2/2005 | Domel | |
| 6,910,515 B2 | 6/2005 | Nien | |
| 6,983,783 B2 | 1/2006 | Carmen, Jr. | |
| 7,051,782 B2 | 5/2006 | Nichols, Jr. | |
| 7,089,991 B2 | 8/2006 | Jorgensen | |
| 7,101,108 B1 * | 9/2006 | Chuang | E06B 9/38 |
| | | | 403/314 |
| 7,104,305 B1 | 9/2006 | Apollon | |
| 7,178,291 B2 | 2/2007 | Vasquez | |
| 7,222,655 B2 | 5/2007 | Toti | |
| 7,240,716 B2 | 7/2007 | Nichols, Jr. | |
| D553,965 S | 10/2007 | Ellbogen | |
| 7,337,825 B1 | 3/2008 | Erbe | |
| 7,401,634 B2 | 7/2008 | Kovach | |
| 7,635,018 B2 | 12/2009 | Carmen, Jr. | |
| 7,673,667 B2 | 3/2010 | Domel | |
| 7,726,379 B2 | 6/2010 | Beau | |
| 7,729,807 B2 | 6/2010 | Guillemot | |
| 7,832,052 B2 | 11/2010 | Vrielink | |
| 7,891,399 B2 | 2/2011 | Rasmussen | |
| 8,113,263 B2 | 2/2012 | Reed | |
| 8,122,932 B2 | 2/2012 | Cannaverde | |
| 8,205,658 B1 | 6/2012 | Lin | |
| 8,251,119 B2 | 8/2012 | Toti | |
| 8,267,234 B2 | 9/2012 | Koop | |
| 8,342,225 B2 | 1/2013 | Fortunato | |
| 8,368,328 B2 | 2/2013 | Mullet | |
| 8,498,747 B2 | 7/2013 | Feldstein | |
| 8,522,854 B2 | 9/2013 | Lin | |
| 8,544,148 B2 | 10/2013 | Keishold | |
| 8,579,004 B2 | 11/2013 | Cannaverde | |
| D714,132 S | 9/2014 | Hazantonis | |
| 8,931,538 B2 | 1/2015 | Ho | |
| 9,038,697 B2 | 5/2015 | Ikeda | |
| 9,074,401 B2 | 7/2015 | Jensen | |
| 9,095,907 B2 | 8/2015 | Mullet | |
| 9,095,908 B2 | 8/2015 | Mullet | |
| 9,161,649 B2 | 10/2015 | Rastegar | |
| 9,206,638 B1 | 12/2015 | Malekpour | |
| 9,249,623 B2 | 2/2016 | Mullet | |
| 9,279,286 B2 | 3/2016 | Higgins | |
| 9,394,743 B2 | 7/2016 | Mullet | |

(56) References Cited

U.S. PATENT DOCUMENTS

| | | |
|---|---|---|
| 9,410,371 B2 | 8/2016 | Faller |
| 9,488,000 B2 | 11/2016 | Kirby |
| 9,540,873 B1 | 1/2017 | Townsley |
| 9,615,687 B2 | 4/2017 | Mullet |
| 9,644,424 B2 | 5/2017 | Slivka |
| 9,725,949 B2 | 8/2017 | Townsley |
| 9,725,952 B2 | 8/2017 | Mullet |
| 9,801,486 B2 | 10/2017 | Mullet |
| 9,890,585 B2 | 2/2018 | Mullet |
| 9,926,741 B2 | 3/2018 | Faller |
| 9,999,313 B2 | 6/2018 | Mullet |
| 10,285,527 B2 | 5/2019 | Mullet |
| 10,405,684 B2 | 9/2019 | Mullet |
| 10,736,452 B2 | 8/2020 | Mullet |
| 10,799,056 B2 | 10/2020 | Mullet |
| 10,874,242 B2 | 12/2020 | Mullet |
| 11,033,138 B2 | 6/2021 | Mullet |
| 11,141,016 B2 * | 10/2021 | Chuang .................. A47H 1/022 |
| 11,773,888 B2 * | 10/2023 | Moss ...................... A47H 1/022 29/525.11 |
| 2004/0129849 A1 | 7/2004 | Walker |
| 2005/0119057 A1 | 6/2005 | Rom |
| 2005/0172563 A1 | 8/2005 | Komoda |
| 2006/0000565 A1 | 1/2006 | Billebault |
| 2006/0021714 A1 | 2/2006 | Carmen et al. |
| 2006/0086874 A1 | 4/2006 | Habel |
| 2006/0130983 A1 | 6/2006 | Nien |
| 2006/0162877 A1 | 7/2006 | Chou |
| 2006/0231215 A1 | 10/2006 | Loo |
| 2006/0272782 A1 | 12/2006 | Nichols, Jr. |
| 2007/0029050 A1 | 2/2007 | Nien |
| 2007/0253768 A1 | 11/2007 | Li |
| 2007/0273309 A1 | 11/2007 | Carmen |
| 2008/0067278 A1 | 3/2008 | Fortunato |
| 2008/0135191 A1 | 6/2008 | Zakowski |
| 2008/0230185 A1 | 9/2008 | Kahn |
| 2008/0230192 A1 | 9/2008 | Kane |
| 2008/0244999 A1 | 10/2008 | Westermann |
| 2009/0283225 A1 | 11/2009 | Luger |
| 2010/0122781 A1 | 5/2010 | Charleux |
| 2010/0181031 A1 | 7/2010 | Cannaverde |
| 2010/0269988 A1 | 10/2010 | Mullet |
| 2010/0294440 A1 | 11/2010 | Li |
| 2011/0048655 A1 | 3/2011 | Andreasen |
| 2011/0056630 A1 | 3/2011 | Buccola, Jr. |
| 2011/0146922 A1 | 6/2011 | Colson et al. |
| 2011/0203754 A1 | 8/2011 | Mullet |
| 2011/0241555 A1 | 10/2011 | Lin |
| 2011/0247174 A1 | 10/2011 | Keishold |
| 2011/0265958 A1 | 11/2011 | Skinner |
| 2012/0031571 A1 | 2/2012 | Mullet et al. |
| 2012/0103924 A1 * | 5/2012 | Chuang .................. A47H 1/022 211/123 |
| 2012/0132376 A1 | 5/2012 | Cannaverde |
| 2012/0187062 A1 * | 7/2012 | Sadler, III .............. A47H 1/022 29/525.01 |
| 2012/0193035 A1 | 8/2012 | Malekpour |
| 2013/0112899 A1 | 5/2013 | Schulz |
| 2013/0198948 A1 * | 8/2013 | Zeng ...................... A47H 1/022 29/428 |
| 2013/0199735 A1 | 8/2013 | Colson et al. |
| 2014/0076115 A1 | 3/2014 | Lee |
| 2014/0076503 A1 | 3/2014 | Mullet |
| 2014/0076505 A1 | 3/2014 | Mullet |
| 2014/0076508 A1 | 3/2014 | Mullet |
| 2014/0262077 A1 | 9/2014 | Watkins |
| 2015/0107788 A1 | 4/2015 | Mullet |
| 2015/0159430 A1 | 6/2015 | Huang |
| 2015/0272370 A1 | 10/2015 | Mullet |
| 2015/0284990 A1 | 10/2015 | Hall |
| 2015/0327705 A1 | 11/2015 | Mullet |
| 2016/0032647 A1 | 2/2016 | Adreon |
| 2016/0053537 A1 | 2/2016 | Dybdahi |
| 2016/0130865 A1 | 5/2016 | De Muelenaere |
| 2016/0143470 A1 | 5/2016 | Mullet |
| 2016/0168906 A1 | 6/2016 | Mullet |
| 2016/0374497 A1 | 12/2016 | McCarthy |
| 2017/0000280 A1 | 1/2017 | Mullet |
| 2017/0081916 A1 | 3/2017 | Greening |
| 2017/0172333 A1 | 6/2017 | Mullet |
| 2017/0181562 A1 | 6/2017 | Mullet |
| 2017/0191311 A1 | 7/2017 | Mullet |
| 2017/0238747 A1 | 8/2017 | Mullet |
| 2017/0238874 A1 | 8/2017 | Gallagher |
| 2018/0106105 A1 | 4/2018 | Anthony |
| 2018/0112463 A1 | 4/2018 | Derk, Jr. |
| 2018/0163465 A1 | 6/2018 | Biedermann |
| 2018/0255953 A1 | 9/2018 | Mullet |
| 2018/0298682 A1 | 10/2018 | Huang |
| 2018/0325327 A1 | 11/2018 | Foreman |
| 2019/0231109 A1 | 8/2019 | Mullet |
| 2019/0231110 A1 | 8/2019 | Mullet |
| 2019/0387912 A1 | 12/2019 | Mullet |
| 2020/0007782 A1 | 1/2020 | Mullet |
| 2020/0069100 A1 | 3/2020 | Mullet |
| 2020/0077829 A1 | 3/2020 | Mullet |
| 2020/0121110 A1 | 4/2020 | Newville |
| 2020/0138226 A1 | 5/2020 | Mullet |
| 2020/0229630 A1 | 7/2020 | Mullet |

FOREIGN PATENT DOCUMENTS

| | | |
|---|---|---|
| JP | 2006314389 | 11/2006 |
| JP | 2009034301 | 2/2009 |
| JP | 2011062497 | 3/2011 |
| KR | 100903201 | 6/2009 |
| KR | 20100006476 | 1/2010 |
| SE | 1200240 | 10/2013 |
| WO | 8602970 | 5/1986 |
| WO | 2014043711 | 3/2014 |
| WO | 2014043713 | 3/2014 |
| WO | 2014169093 | 10/2014 |
| WO | 2015009565 | 11/2015 |

OTHER PUBLICATIONS

"Granada" drapery rod offered by Forest Drapery Hardware, of 2500 Donn Drive, Cartersville GA 30120; Jul. 19, 2021.

SomfySystems "How to Video: Re-loadable Battery Wand" Aug. 11, 2011 <https://www.youtube.com/watch?v=xxR5tj3HO2M>.

Spiral Ratchet Screwdriver Phillips Slotted Bits Tool by Generic Posted on Jul. 14, 2010 by Amazon Customer. Found on Jul. 23, 2021 <http://www.amazon.com/Spiral-Ratchet-Screwdriver-Phillips-Slotted/dp/B000RB3X24/ref=sr_1_6?ie=UTF8&qid=143776266 &sr=8-6&keywords=yankee+screwdriver&pebp=1437762678126 &perid=0K5M1P3TQQST33CWVE7>.

* cited by examiner

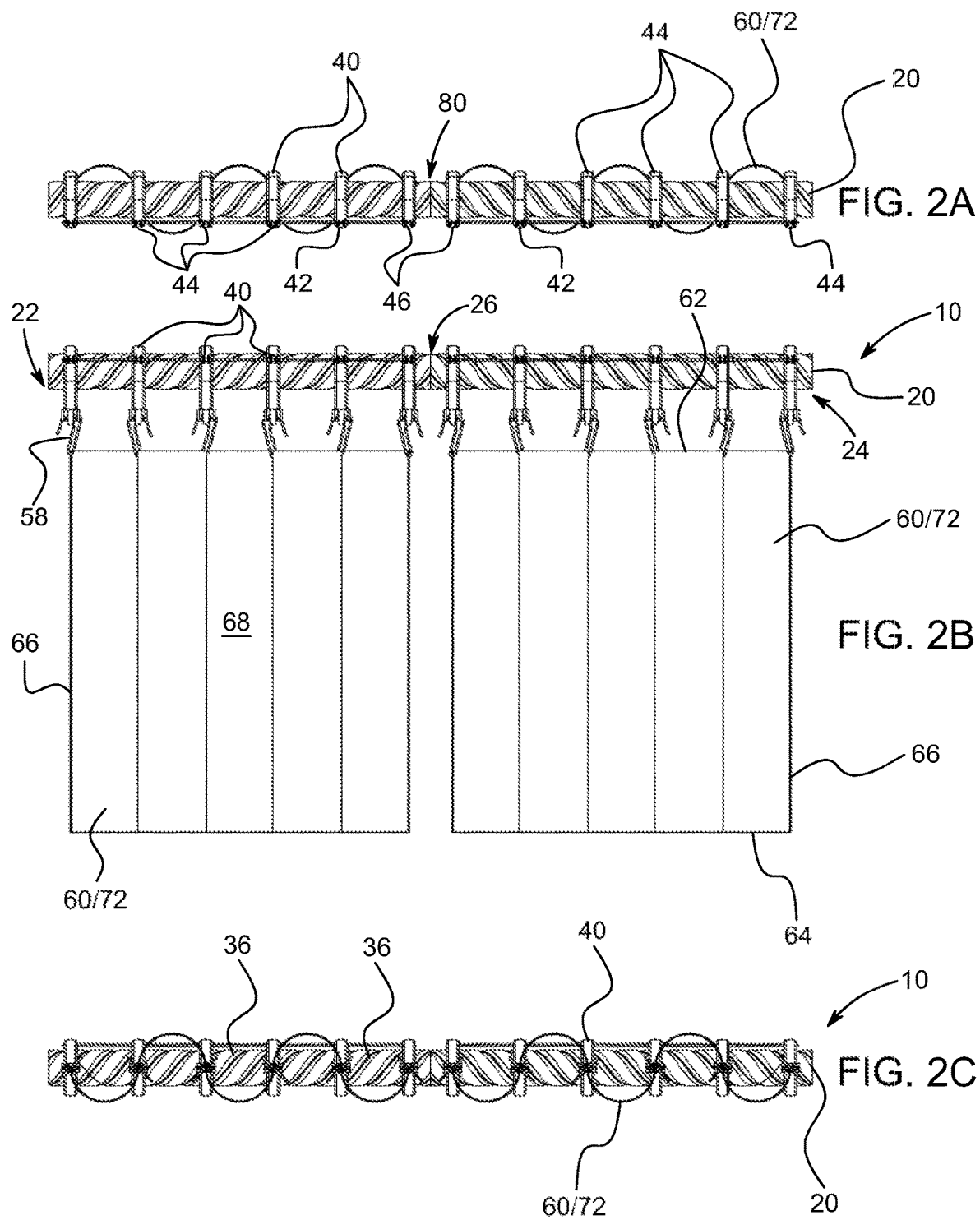

SPLICE CONNECTOR SYSTEM FOR ARCHITECTURAL COVERING SUPPORT RODS

CROSS REFERENCE TO RELATED APPLICATIONS

This application claims priority to U.S. Provisional Application No. 63/034,018 filed Jun. 3, 2020 and titled SPLICE CONNECTOR SYSTEM FOR ARCHITECTURAL COVERING SUPPORT RODS, which is hereby incorporated herein fully by reference in its entirety.

FIELD OF THE DISCLOSURE

This disclosure relates to window coverings. More specifically and without limitation, this disclosure relates to drapery window coverings.

OVERVIEW

Architectural coverings, such as curtains, shades, draperies and the like are frequently used to provide privacy as well as to limit the amount of light that is permitted to pass through a window and into a room and/or building. There are countless types, forms and designs of architectural coverings known in the art. The term architectural covering is used to describe any and all of these types, forms and designs including blinds, shades, draperies, and the like.

One form of architectural covering of particular interest in this application is commonly referred to as a drapery. Common components of drapery include a support rod connected at its ends to brackets and shade material connected to and hanging down from the support rod. Drapery shades can include blackout shades and shear shades which can be independently opened and controlled by laterally sliding them along the support rod.

Recent improvements have failed to come up with improved technologies for convenient assembly systems for draperies. There is a need in the art for convenient assembly systems for draperies, and the like.

The need for simplified, even foolproof, installation, has become ever more important with new generations of users who may lack the tools and/or capabilities to install complex window covering assemblies, and/or simply newer generations of users which expect more ease.

One challenge in the installation of architectural covering is transportation of materials through hallways, stairwells, and/or elevators of a building, for example, to the location of installation. This can be particularly challenging when installing architectural coverings over wide spanning openings.

Thus, it is an object of the disclosure to provide a system for joining multiple support rod segments into a uniform support rod for use in an architectural covering system.

Yet another object of the disclosure is to provide a support rod for a motorized drapery system.

Another object of the disclosure is to provide a drapery system that provides aesthetically pleasing results when installed.

Yet another object of the disclosure is to provide a drapery system configured to join support rod segments configured for lateral movement of drapery rings when rotated.

Another object of the disclosure is to provide a drapery attachment system that makes it easier to install draperies.

Yet another object of the disclosure is to provide a drapery attachment system that makes it less expensive to install draperies.

Another object of the disclosure is to reduce the cost and complexity of shipping motorized drapery systems.

These and other objects, features, and/or advantages of the present disclosure will become apparent from the specification, claims and drawings.

SUMMARY OF THE DISCLOSURE

In one or more embodiments, a drapery system is presented. The system includes a drapery support rod having a plurality of segments joined by one or more splice connectors. In one or more embodiments, a splice connector is generally cylindrical shaped and extending between first and second opposing ends. The splice connector includes a first section extending from the first end to an intermediate point and a second section extending from the intermediate point to the second end. The first section is configured to engage and connect with an end of a first segment of the drapery support rod. The second section is configured to engage and connect with an end of a second segment of the drapery support rod; thereby operably connecting the first and second segments of the drapery support rod.

In one or more embodiments, the drapery support rod includes a helical guide structure on the exterior surface of the support rod. The system includes a plurality of ring members, which are configured and arranged to attach to an upper edge of a shade material and suspend the shade material from the drapery support rod. One or more of the rings are configured to engage with the helical guide structure in a manner causing the one or more rings to move the shade material laterally to a closed position in response to rotation of the support rod in a first direction and move the shade material laterally to an open position in response to rotation of the drapery support rod in a second direction.

In one or more embodiments, exterior surfaces of the first and second sections of the splice connector are configured and arranged to engage and connect with interior surfaces of the first and second segments of the drapery support rod.

In one or more embodiments, the exterior surfaces of the first and second sections of the splice connector have features configured and arranged to engage and connect with features on interior surfaces of the first and second segments of the drapery support rod.

In one or more embodiments, the first segment has a first internal surface including a first helical protrusion and the second segment has a second internal surface including a second helical protrusion. The first section of the splice connector has a first external surface having a first helical recess configured to match the first helical protrusion when the first section is fully inserted into the first segment. The second section of the splice connector has a second external surface having a second helical recess configured to match the second helical protrusion when the second section is fully inserted into the second segment.

In one or more embodiments, the first helical protrusion and first helical recess have a right hand helical rotation and the second helical protrusion and second helical recess have a left hand helical rotation. In one or more embodiments, the first and second helical protrusions and first and second helical recesses have a right hand helical rotation. In one or more embodiments, the first and second helical protrusions and first and second helical recesses have a left hand helical rotation.

In one or more embodiments, the first section has an external surface having one or more features configured and arranged to engage a smooth interior of the first segment and, when the first section is fully inserted in the first segment, operably connect the first section to the first segment. The second section has an external surface having one or more features configured to engage a smooth interior of the second segment and, when the second section is fully inserted in the second segment, operably connect the second section to the second segment.

In one or more embodiments, the splice connector further includes a stop feature in between the first and second sections.

In one or more embodiments, the splice connector further includes a support feature configured and arranged to engage with a corresponding feature on an internal surface of the first segment. In one or more embodiments, the support feature is a shoulder shaped protrusion, and the corresponding feature is a recess configured to mate with the shoulder shaped feature.

In one or more embodiments, the shade material is a pinch pleat drapery. In one or more embodiments, the shade material is a ripplefold drapery.

In one or more embodiments, the splice connector includes first and second planar sides. In one or more embodiments, the planar sides are configured and arranged to facilitate separation of two halves of a mold used to form the splice connector.

In one or more embodiments, the splice connector includes one or more support members configured to oppose compressive forces exerted on an external surface of the splice connector. In one or more embodiments, the splice connector includes one or more support members configured to prevent deformation of the splice connector. In one or more embodiments, the splice connector includes one or more support members configured to resist bending of the splice connector. In one or more embodiments, the splice connector includes one or more support members extending outward from a center axis of the splice connector.

In one or more embodiments, the splice connector includes a compressible section. In one or more embodiments, the splice connector includes a cutout in the external surface of the splice connector.

In one or more embodiments, the splice connector includes a tapered portion.

BRIEF DESCRIPTION OF THE DRAWINGS:

FIG. 2A shows a top view of a drapery system, in accordance with one or more arrangements; the view showing the system having a support rod with helical guides on the exterior surface, and rings and ripplefold drapery attached thereto.

FIG. 2B shows a front view of a drapery system, in accordance with one or more arrangements; the view showing the system having a support rod with helical guides on the exterior surface, and rings and ripplefold drapery attached thereto.

FIG. 2C shows a bottom view of a drapery system, in accordance with one or more arrangements; the view showing the system having a support rod with helical guides on the exterior surface, and rings and ripplefold drapery attached thereto.

Figure 1A:
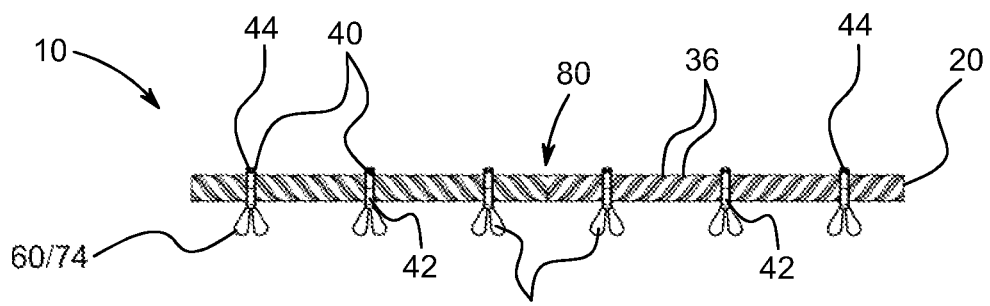
FIG. 1A shows a top view of a drapery system, in accordance with one or more arrangements; the view showing the system having a support rod with helical guides on the exterior surface, and rings and pinch pleat drapery attached thereto.
Figure 1B:
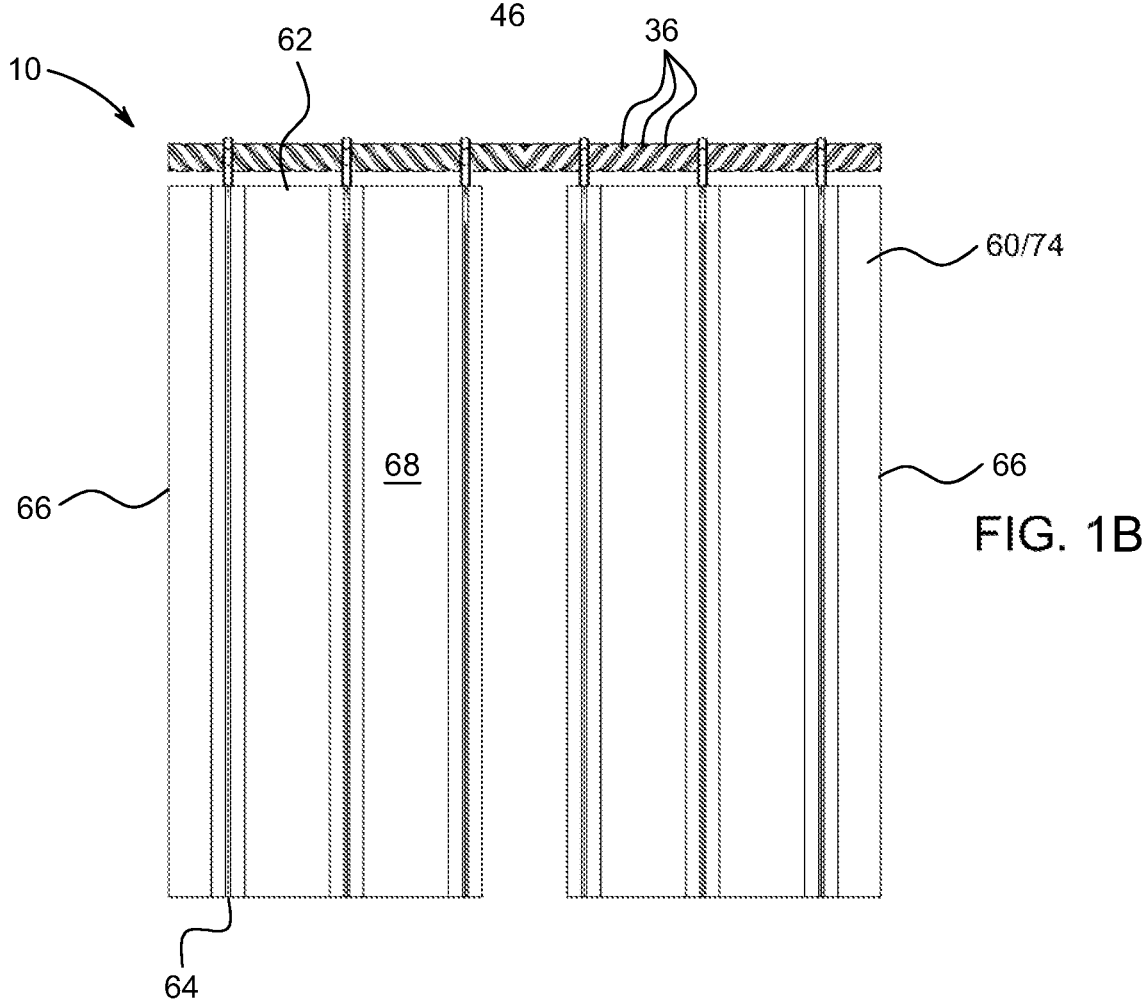
FIG. 1B shows a front view of a drapery system, in accordance with one or more arrangements; the view showing the system having a support rod with helical guides on the exterior surface, and rings and pinch pleat drapery attached thereto.
Figure 1C:
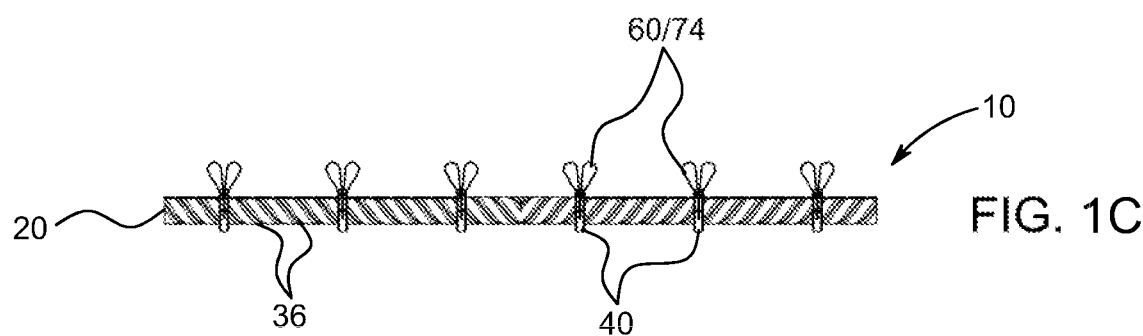
FIG. 1C shows a bottom view of a drapery system, in accordance with one or more arrangements; the view showing the system having a support rod with helical guides on the exterior surface, and rings and pinch pleat drapery attached thereto.
Figures 1D, 1E:
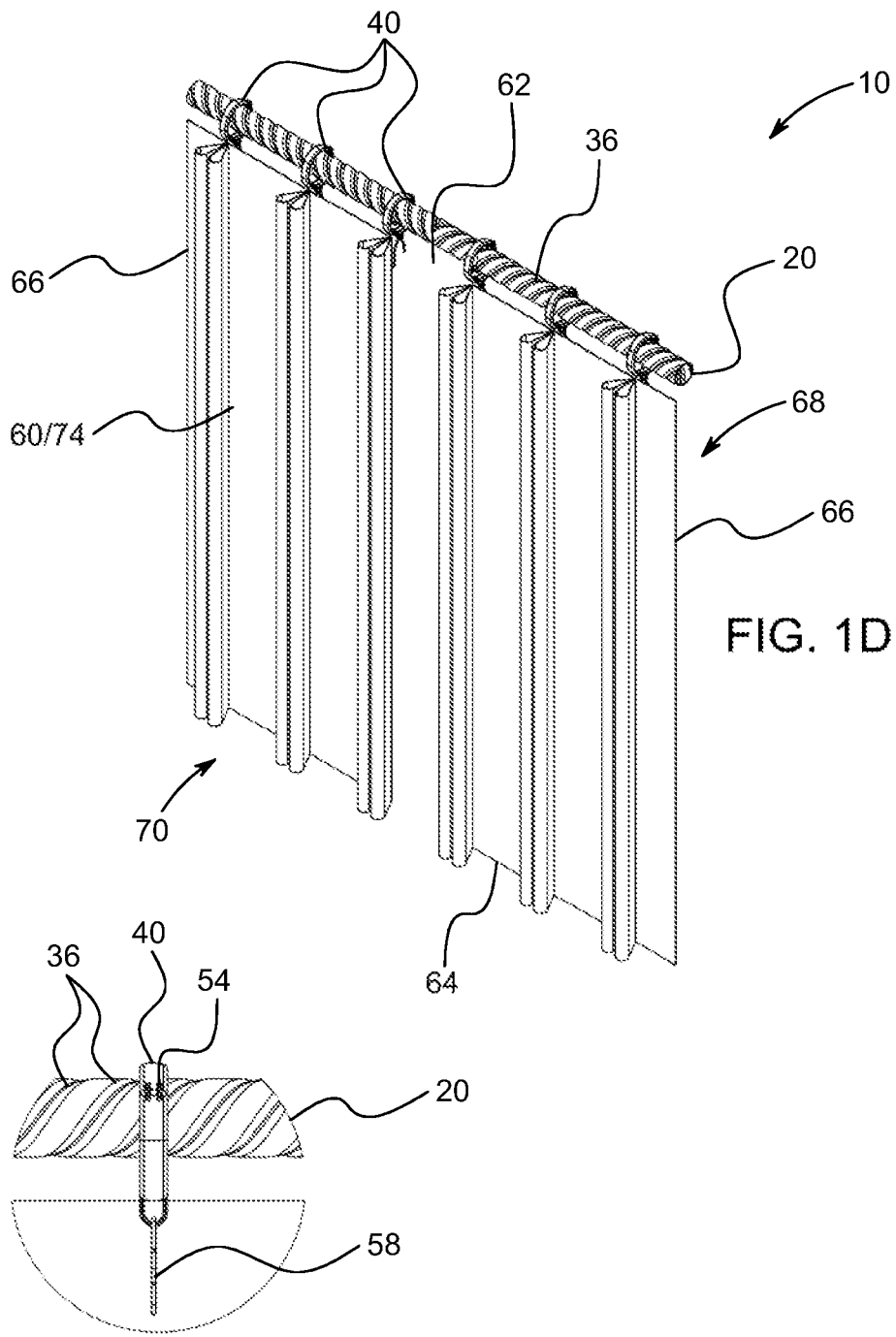
FIG. 1D shows an upper front left perspective view of a drapery system, in accordance with one or more arrangements; the view showing the system having a support rod with helical guides on the exterior surface, and rings and pinch pleat drapery attached thereto.
FIG. 1E shows a close-up view of a section of the drapery support rod with a ring attached thereto, in accordance with one or more arrangements; the close-up view showing the ring having an attachment member and a shade connection member installed on the ring.
Figure 2D:
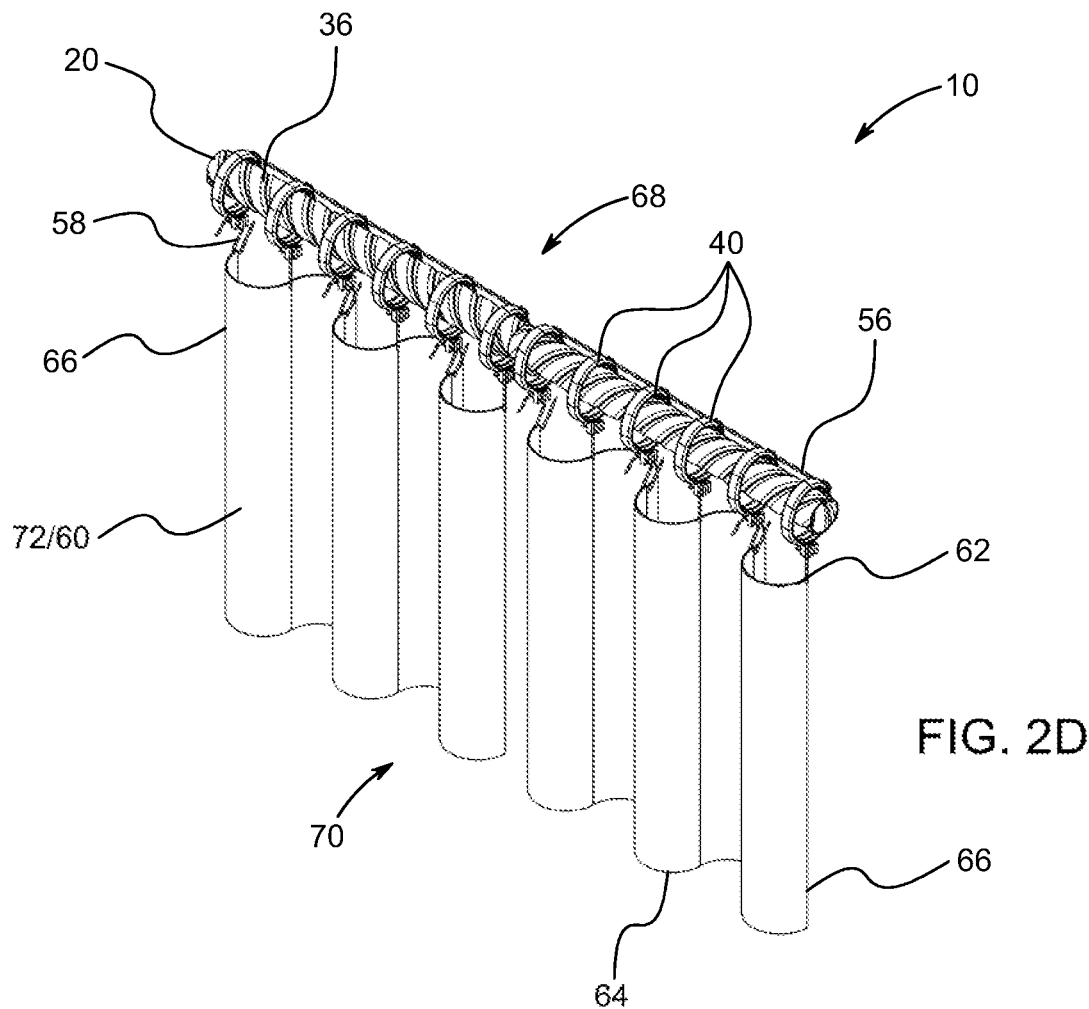
FIG. 2D shows an upper front left perspective view of a drapery system, in accordance with one or more arrangements; the view showing the system having a support rod with helical guides on the exterior surface, and rings and ripplefold drapery attached thereto.
Figure 2E:
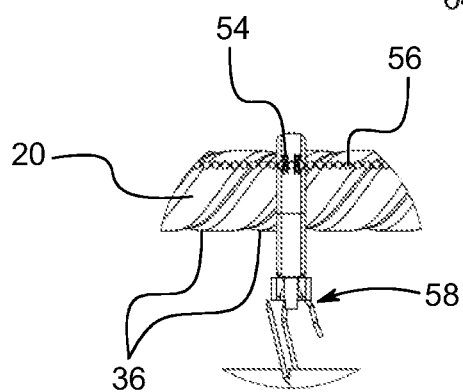
FIG. 2E shows a close-up view of a section of the drapery support rod with a ring attached thereto in accordance with one or more arrangements, the close-up view showing the ring having an attachment member and a shade connection member installed on the ring.
Figure 3:
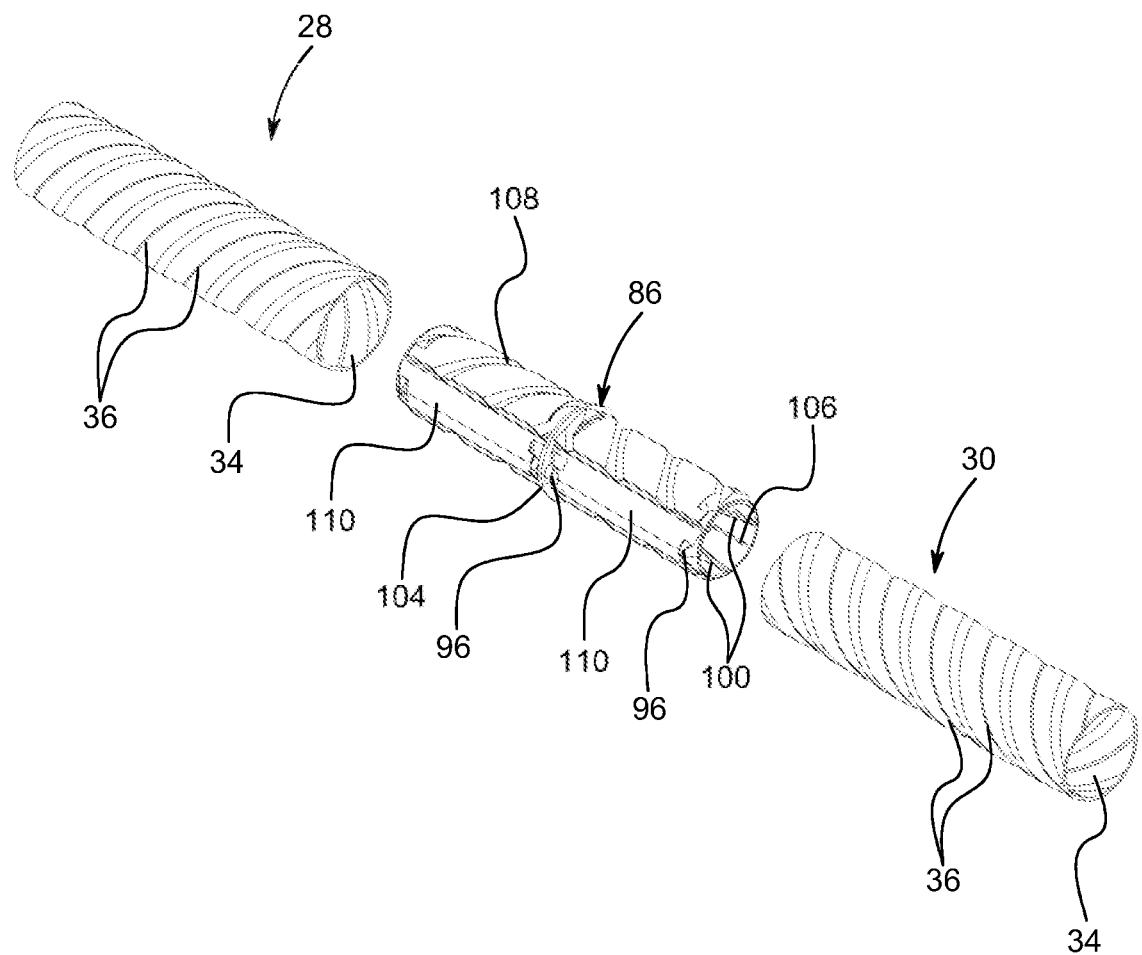
FIG. 3 shows an exploded perspective view of a drapery support rod with a first segment, a second segment, and a splice connector, in accordance with one or more arrangements; the view showing the first and second segments having helical guides on their exterior surface and a helical feature on their interior surface; the view showing the splice connector having a helical feature on its exterior surface, a stop member, and planar sides.
Figure 4:
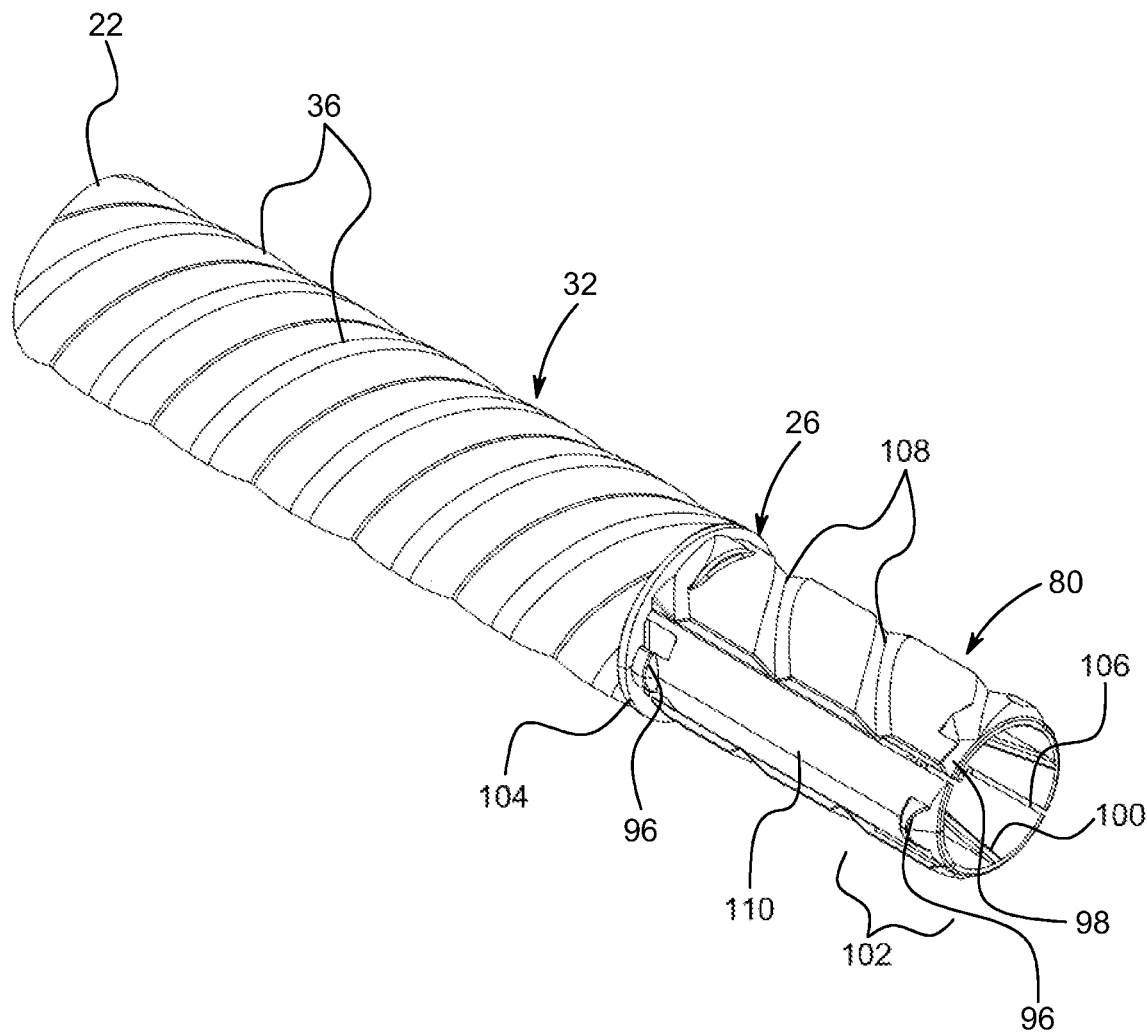
FIG. 4 shows an perspective view of a first segment of a drapery support rod, in accordance with one or more arrangements; the view showing the drapery support rod having helical guides on its exterior surface connected to a first section of a splice connector; the view showing a second section of the splice connector visible opposite the first segment.
Figure 5:
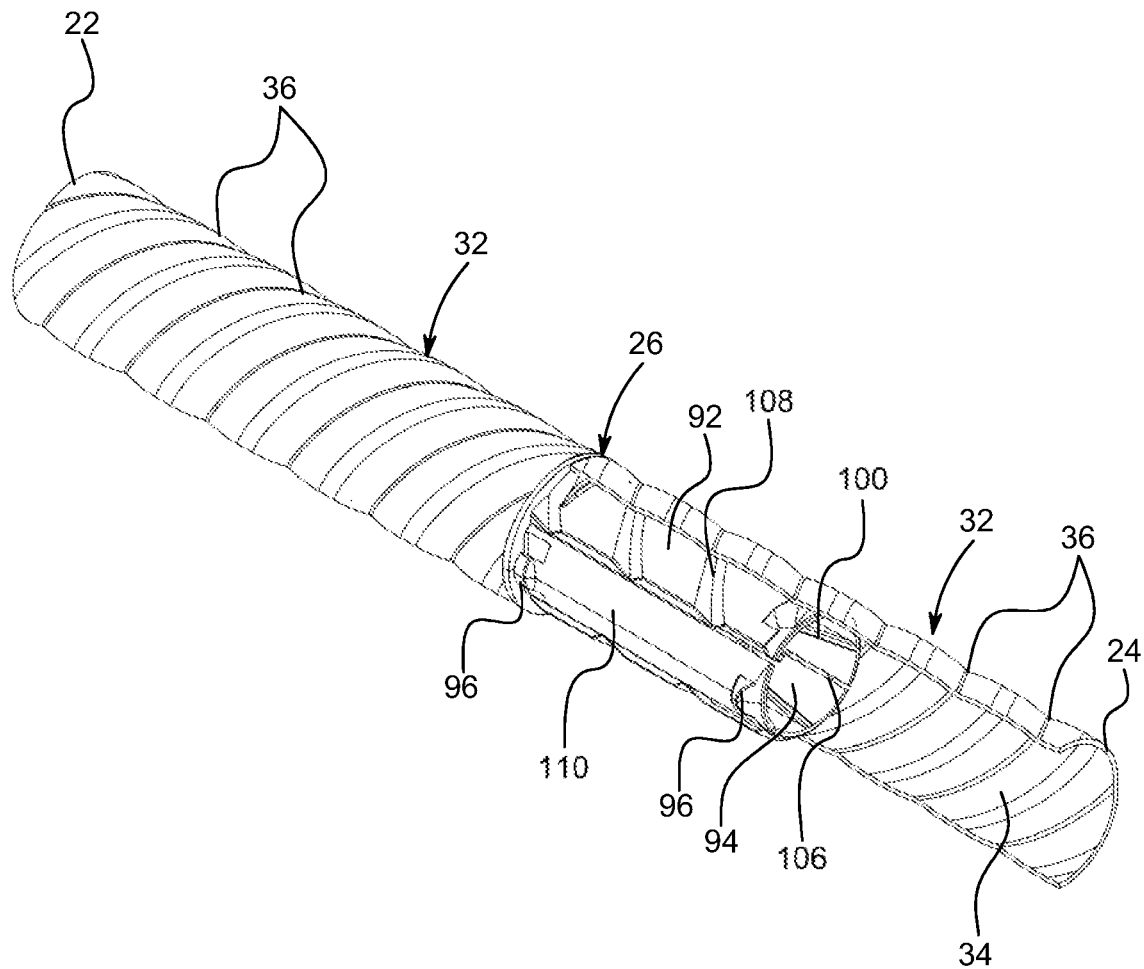
FIG. 5 shows a perspective cut-away view of a first segment of a drapery support rod, in accordance with one or more arrangements; the view showing the drapery support rod connected to a first section of a splice connector, with the cut-away showing a second segment connected to a second section of the splice connector.
Figure 6:
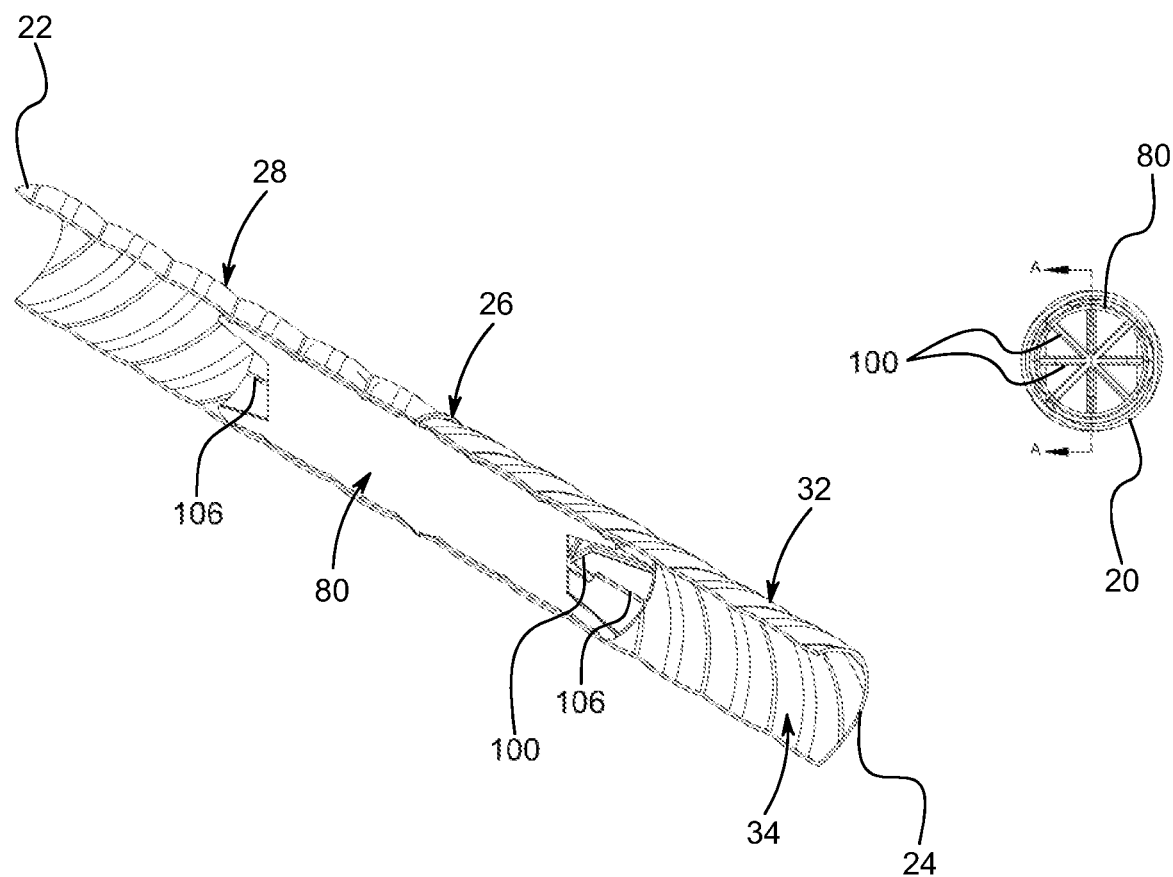
FIG. 6 shows a perspective cut-away view of a drapery support rod, in accordance with one or more arrangements; the view showing the drapery support rod with a first segment and second segment connected by a splice connector; the view showing the hollow interior of the first and second segments and a partial hollow interior of the splice connector.
Figure 7:
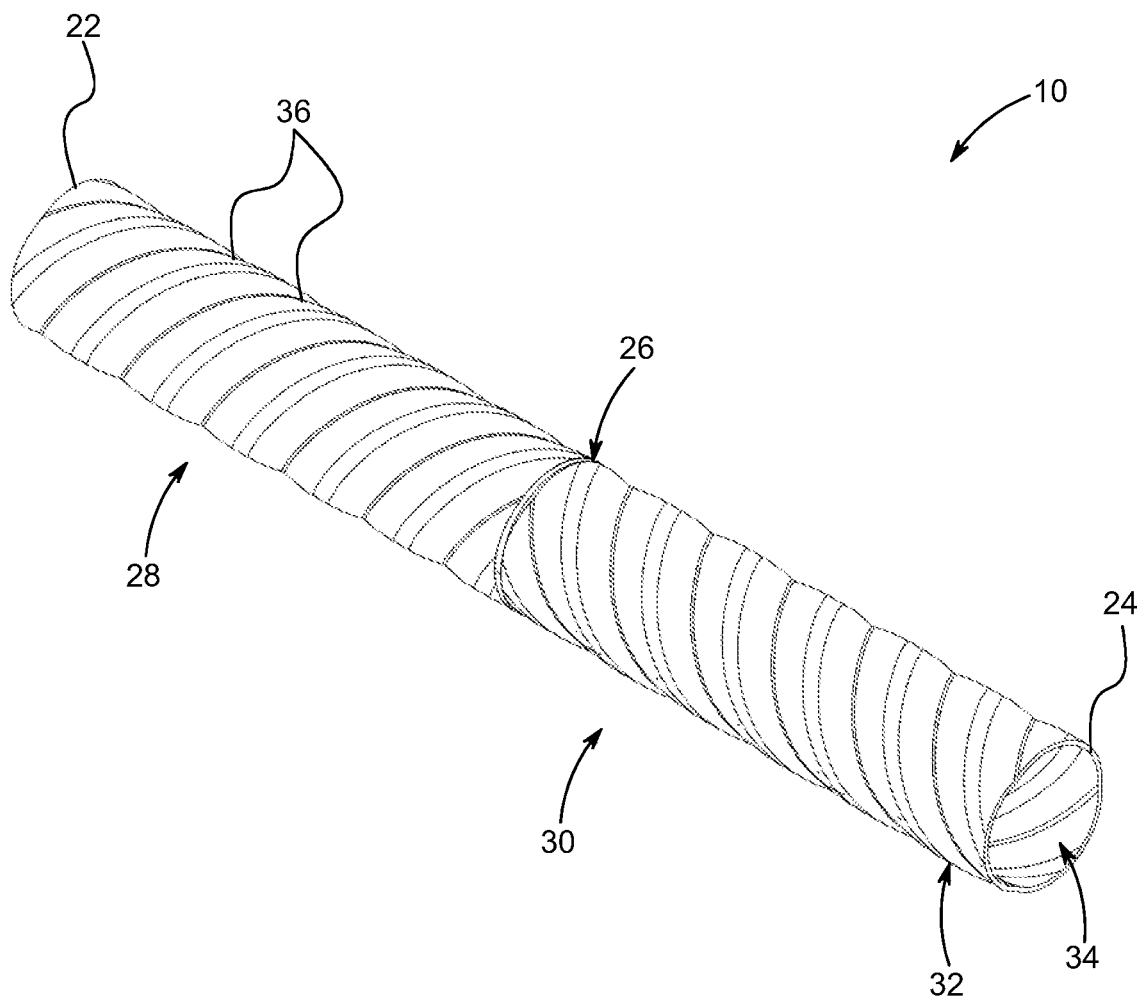
FIG. 7 shows a perspective view of a drapery support rod, in accordance with one or more arrangements; the view showing the drapery support rod with a first segment and second segment both having helical guides in their exterior surface connected by a splice connector; the view showing a stop member of the splice connector being flush with the exterior of the first segment and the second segment.
Figure 8:
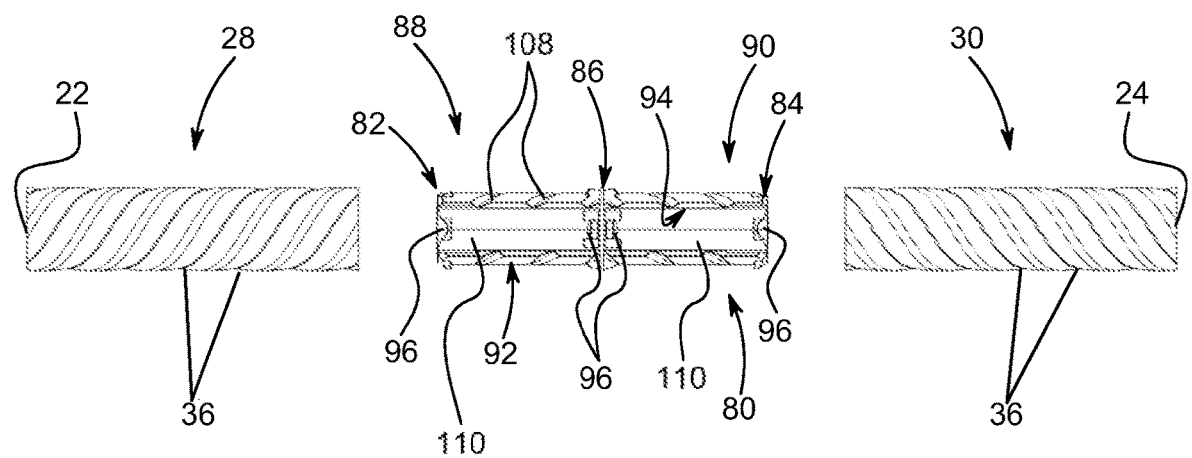
FIG. 8 shows an elevation exploded view of a drapery support rod, in accordance with one or more arrangements; the view showing the drapery support rod with a first segment and second segment shown along with a splice connector in the middle; the view showing the first and second segments having a helical guide on their exterior surface and the splice connector having a helical feature and support features on its exterior surface.
Figure 9:
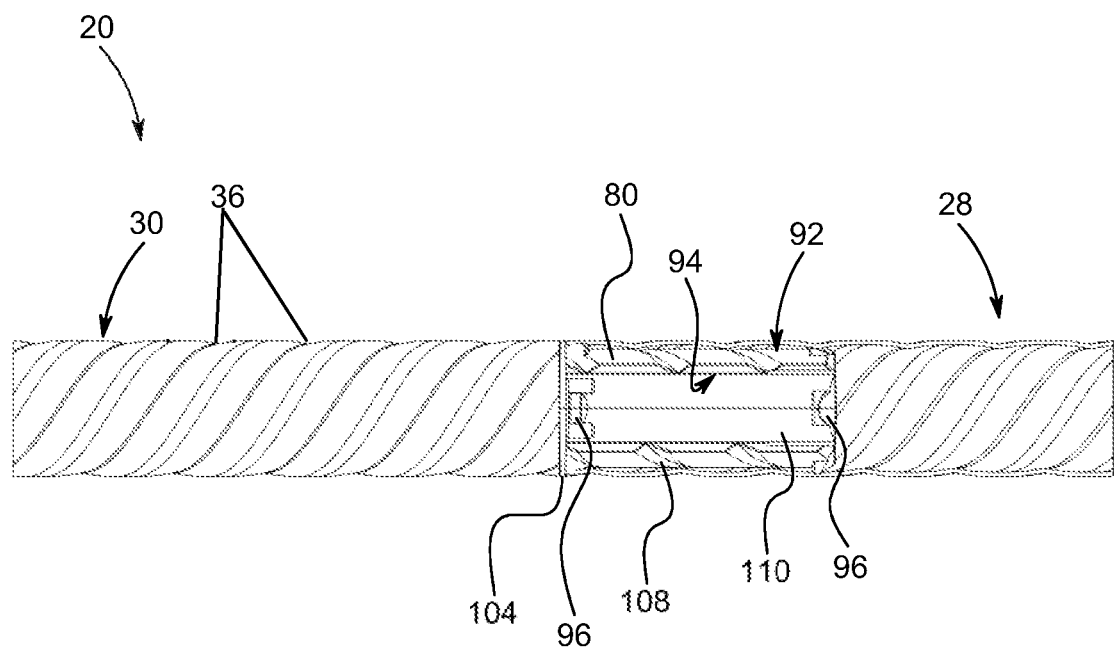
FIG. 9 shows an elevation cut-away view of a drapery support rod, in accordance with one or more arrangements; the view showing the drapery support rod with a first segment and second segment both having helical guides on their exterior surface connected by a splice connector, the cut-away showing the splice connector as it sits inside the first segment of the drapery support rod.
Figure 10:
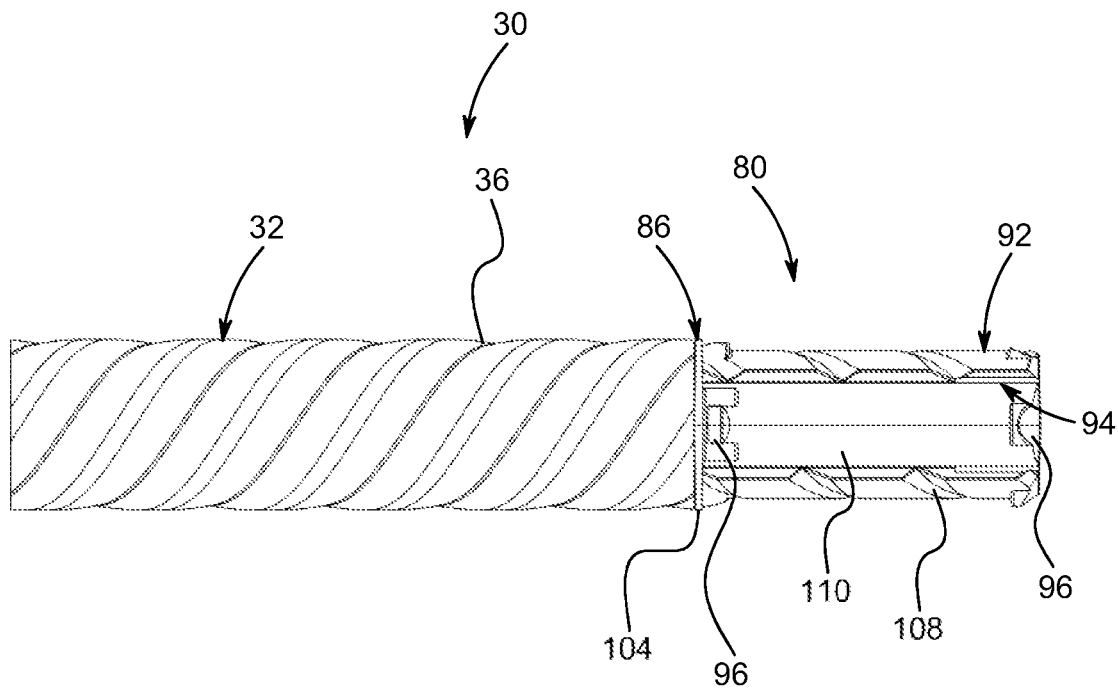
FIG. 10 shows an elevation view of a drapery support rod, in accordance with one or more arrangements; the view showing the second segment of a drapery support rod connected to a second section of a splice connector, with a first section of the splice connector visible opposite the second segment.
Figure 11:
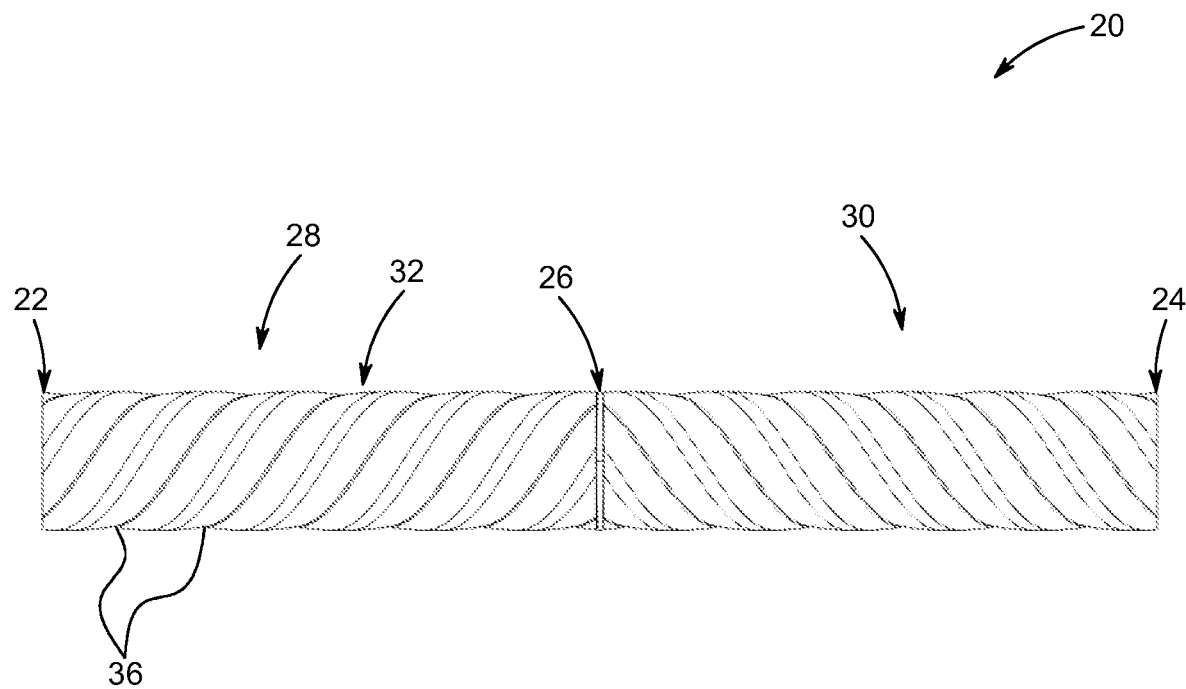
FIG. 11 shows an elevation view of a drapery support rod, in accordance with one or more arrangements; the view showing the drapery support rod with a first and second segment connected by a splice connector; the view showing the stop member of the splice connector flush with the exterior surface of the first and second segments.
Figure 12:
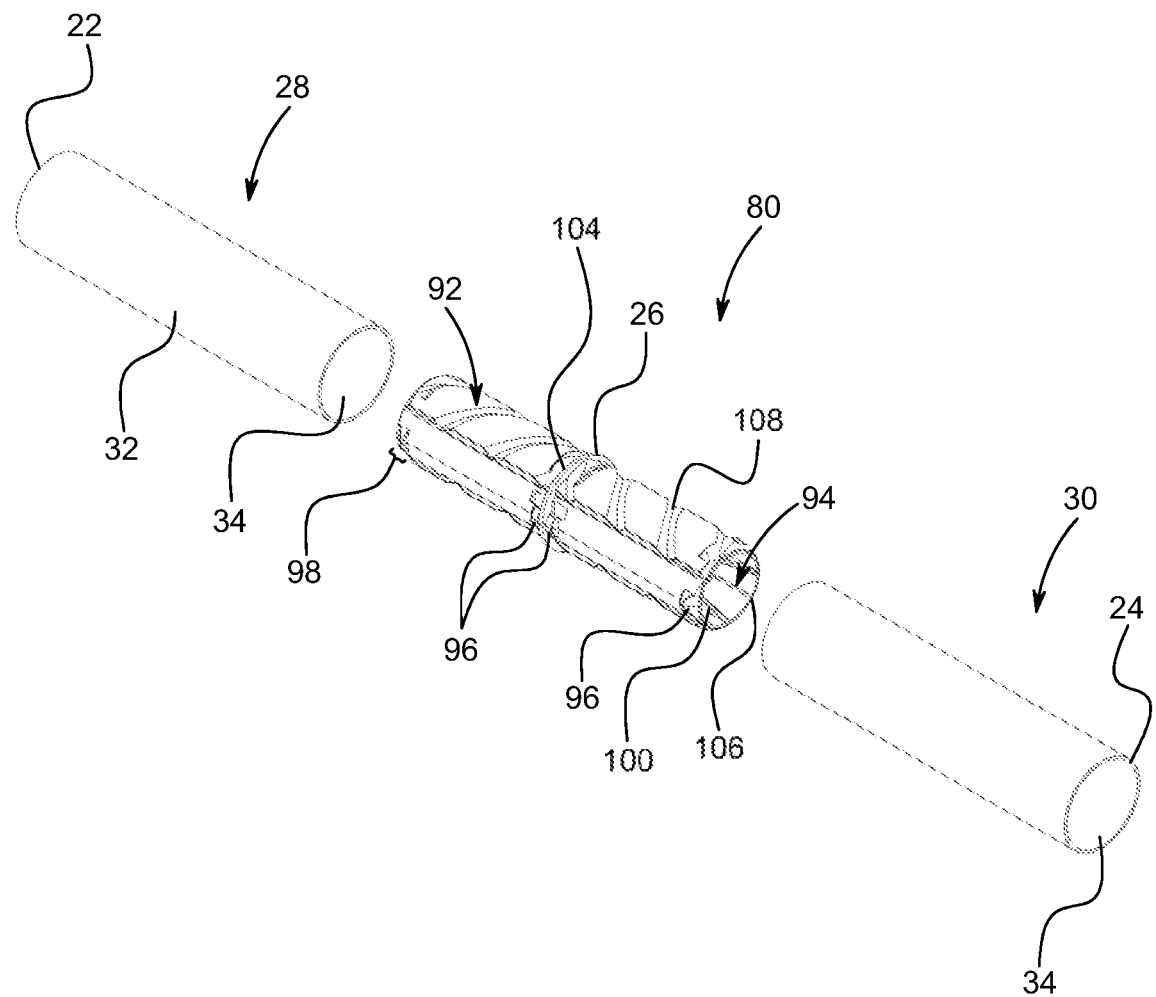
FIG. 12 shows a perspective exploded view of a drapery support rod, in accordance with one or more arrangements; the view showing the drapery support rod with a first segment, a second segment, and a splice connector visible shown; the view showing the first and second segments having smooth interior and exterior surfaces and the splice connector having a stop member, planar sides, support members and cutouts.
Figure 13:
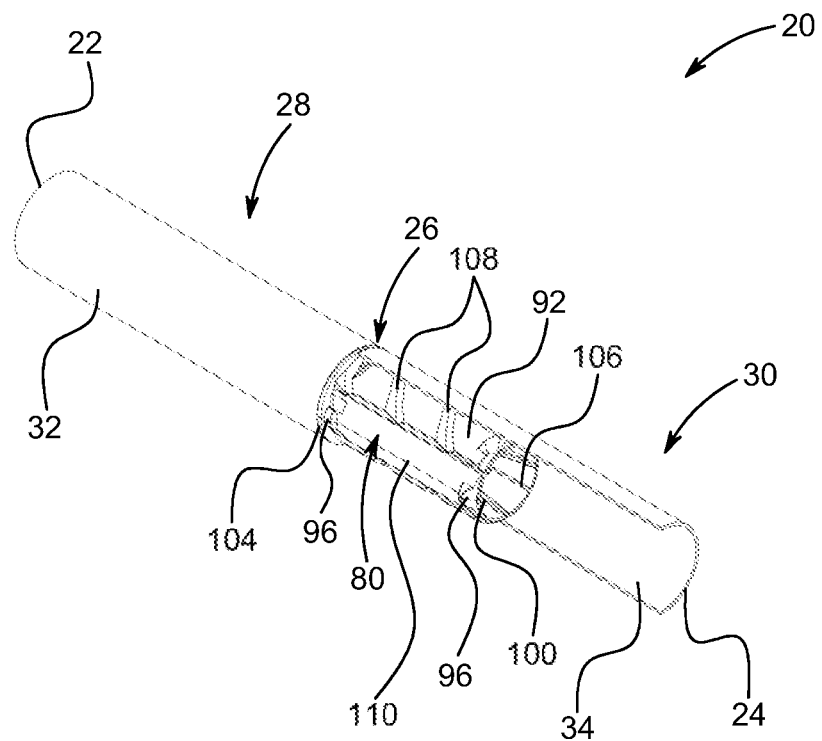
FIG. 13 shows a perspective view of a first segment of a drapery support rod, in accordance with one or more arrangements; the view showing the drapery support rod with a smooth exterior surface connected to a first section of a splice connector, with a second section of the splice connector visible opposite the first segment.
Figure 14:
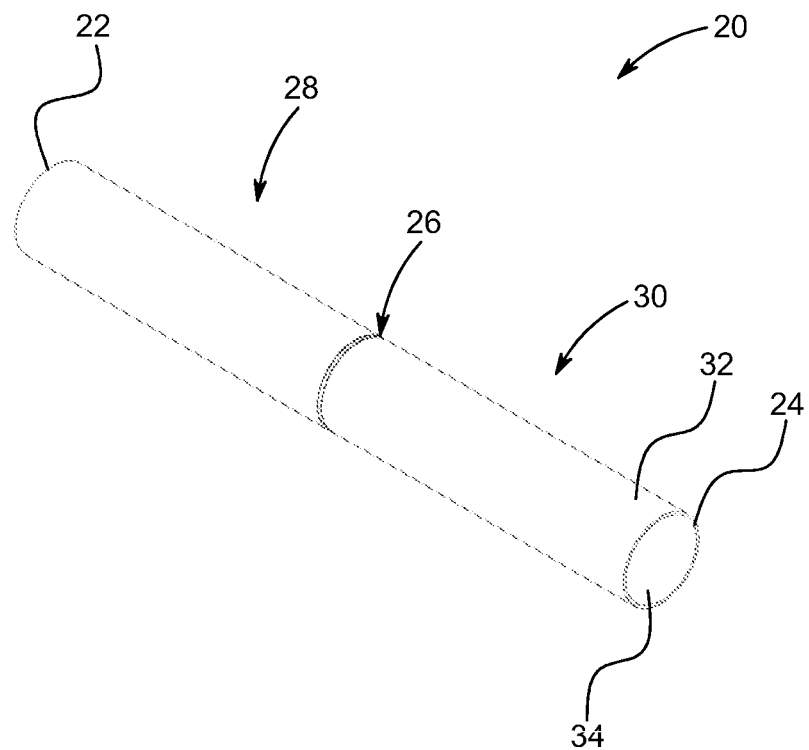
FIG. 14 shows a perspective view of a drapery support rod, in accordance with one or more arrangements; the view showing the drapery support rod with a first segment and second segment both having smooth exterior surfaces connected by a splice connector, with the stop member of the splice connector being flush with the exterior of the first segment and the second segment.
Figure 15:
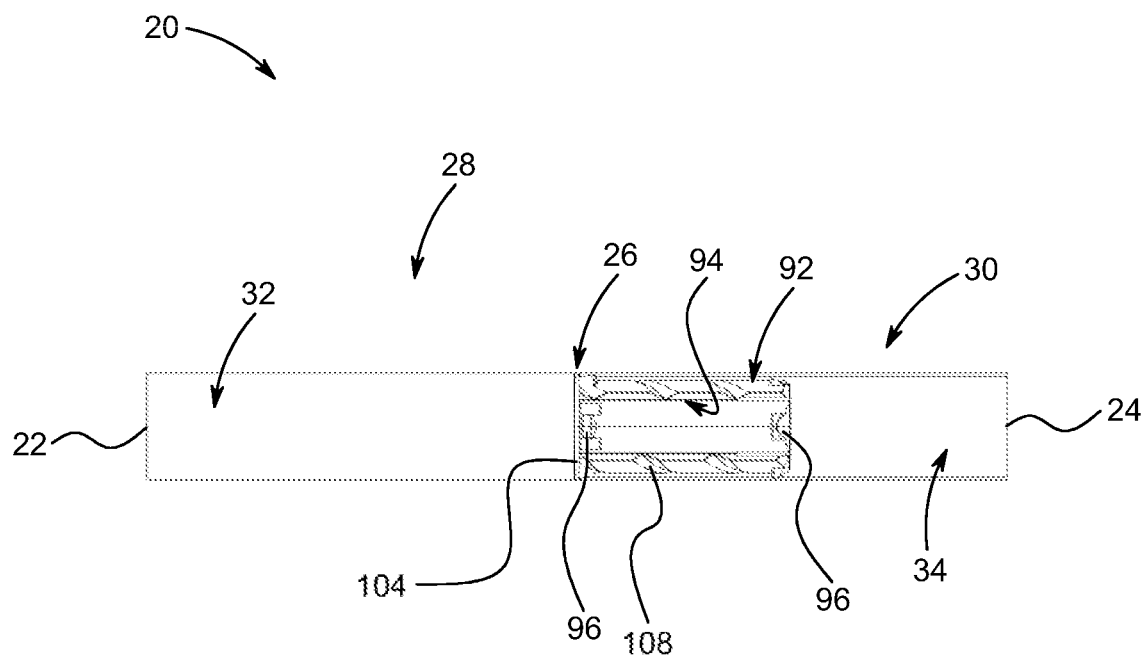
FIG. 15 shows an elevation cut-away view of a drapery support rod, in accordance with one or more arrangements; the view showing the drapery support rod with a first segment and second segment both having smooth exterior surfaces connected by a splice connector, the cut-away showing the splice connector as it sits inside the second segment of the drapery support rod.
Figure 16:
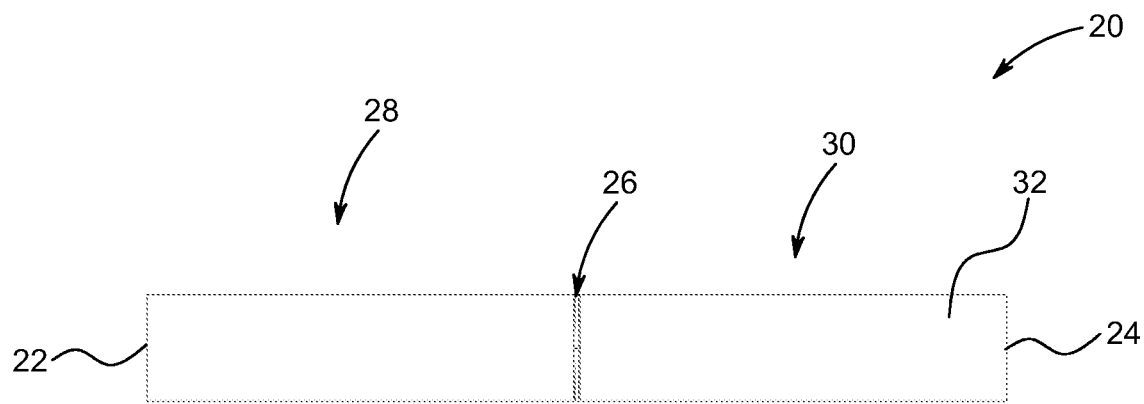
FIG. 16 shows an elevation view of a drapery support rod, in accordance with one or more arrangements; the view showing the drapery support rod with a first segment and second segment both having smooth exterior surfaces connected by a splice connector, with the stop member of the splice connector being flush with the exterior of the first segment and the second segment.
Figure 17:
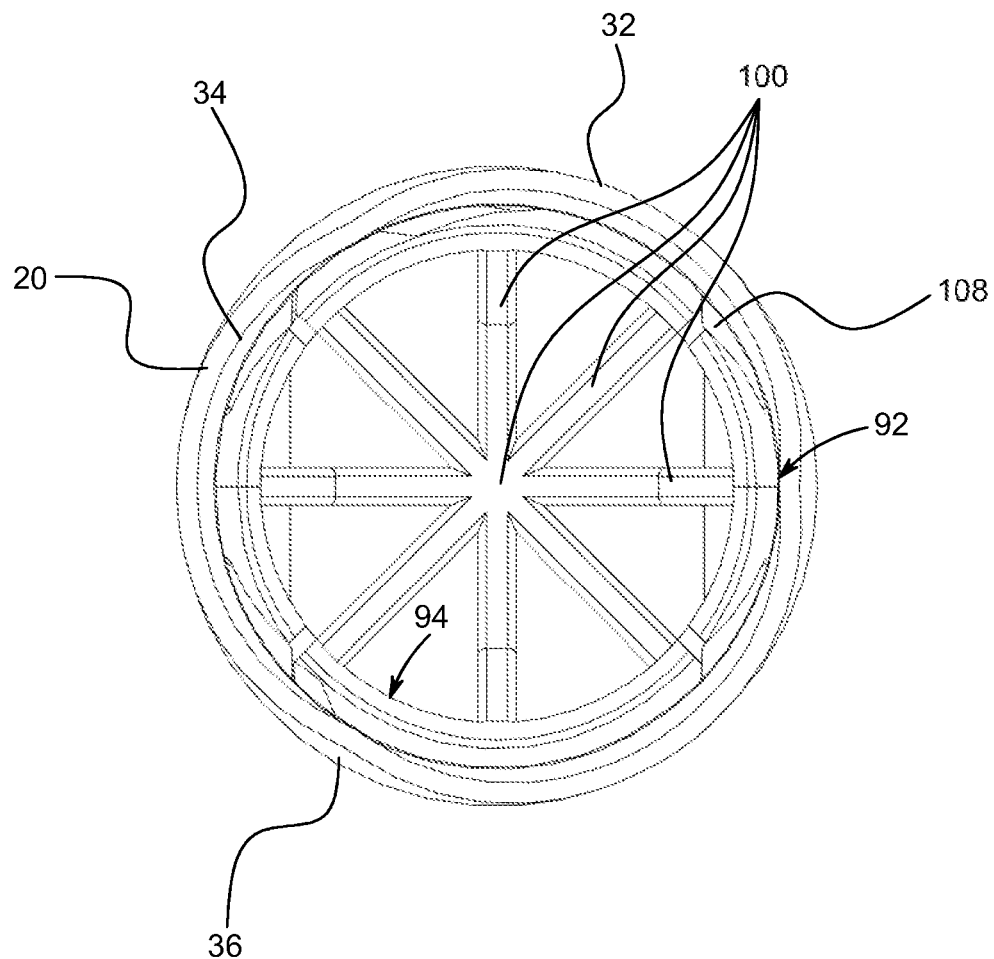
FIG. 17 shows a section view of a splice connector, in accordance with one or more arrangements; the view showing the splice connector having a partially hollow interior with support members extending from the middle of the partially hollow interior outwards to the interior surface of the splice connector.
Figure 18:
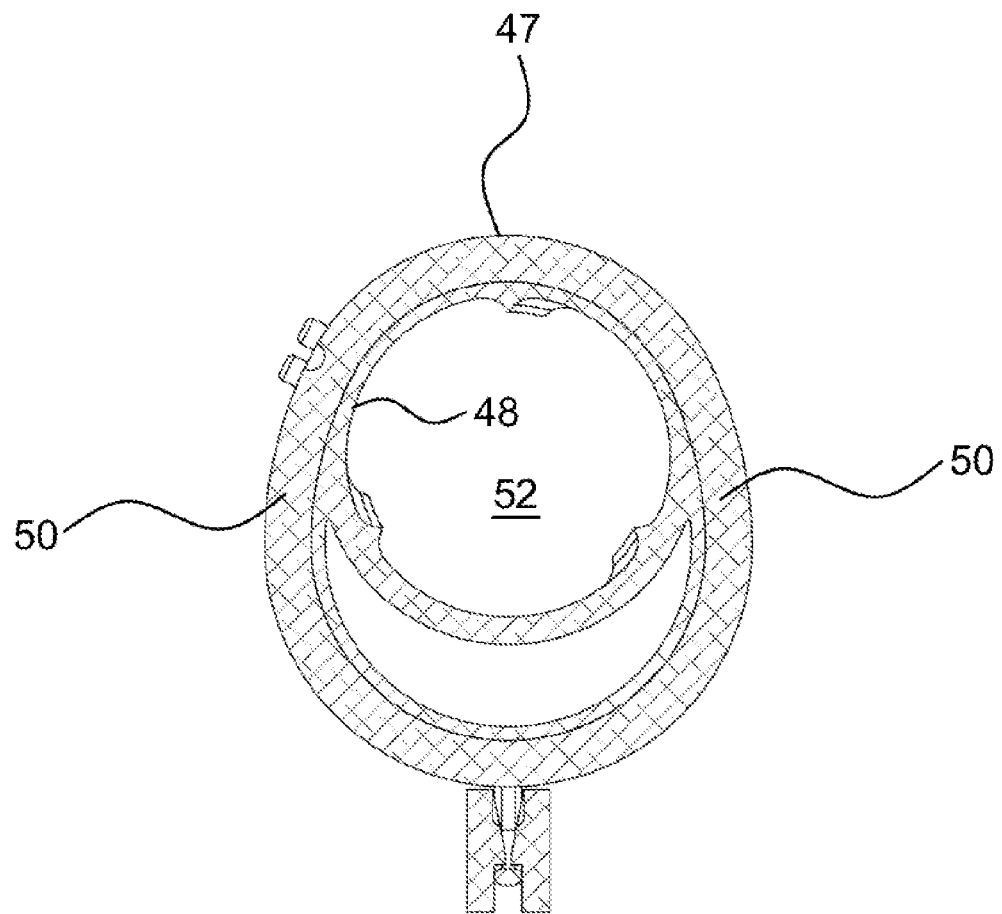
FIG. 18 shows a generally cylindrically shaped ring for a drapery system, in accordance with one or more arrangements; the view showing the ring having a hollow interior, an exterior surface, interior surface, and sides.

DETAILED DESCRIPTION OF THE DISCLOSURE:

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in and/or described with reference to certain figures and/or embodiments, it will be appreciated that features from one figure and/or embodiment may be combined with features of another figure and/or embodiment even though the combination is not explicitly shown and/or explicitly described as a combination. In the depicted embodiments, like reference numbers refer to like elements throughout the various drawings.

It should be understood that any advantages and/or improvements discussed herein may not be provided by various disclosed embodiments, and/or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure and/or invention. Furthermore, although some disclosed embodiments may be described relative to specific materials, embodiments are not limited to the specific materials and/or apparatuses but only to their specific characteristics and capabilities and other materials and apparatuses can be substituted as is well understood by those skilled in the art in view of the present disclosure. Moreover, although some disclosed embodiments may be described in the context of window treatments, the embodiments are not so limited. It is appreciated that the embodiments may be adapted for use in other applications which may be improved by the disclosed structures, arrangements and/or methods.

It is to be understood that the terms such as left, right, top, bottom, front, back, side, height, length, width, upper, lower, interior, exterior, inner, outer, and the like as may be used herein, merely describe points of reference and do not limit the present invention to any particular orientation and/or configuration.

As used herein, "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence and/or addition of one or more other features, characteristics, steps, operations, elements, components, and/or groups thereof, unless expressly indicated otherwise. For example, if an embodiment of a system is described at comprising an article, it is understood the system is not limited to a single instance of the article unless expressly indicated otherwise, even if elsewhere another embodiment of the system is described as comprising a plurality of articles.

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments and/or methods.

Similarly, the structures and operations discussed below may occur out of the order described and/or noted in the figures. For example, two operations and/or figures shown in succession may in fact be executed concurrently and/or may sometimes be executed in the reverse order, depending upon the functionality/acts involved. Similarly, individual operations within example methods described below may be executed repetitively, individually and/or sequentially, to provide looping and/or other series of operations aside from single operations described below. It should be presumed that any embodiment and/or method having features and functionality described below, in any workable combination, falls within the scope of example embodiments.

As used herein, the disclosure is shown and described as being used in association with a window covering, however the disclosure is not so limiting. Instead, one of ordinary skill in the art will appreciate that the disclosed splice connector, presented herein, can be applied to various other devices, without limitation. The system is merely shown and described as being used in association with a window covering for ease of description and as one of countless examples.

As used herein, the term window covering refers to any covering such as a blind, drapery, roller shade, venetian blind and the like, used especially in association with windows. This term is in no way meant to be limiting. Instead, one of ordinary skill in the art will appreciate that the system presented herein can be applied to any window covering, without limitation.

System 10:

With reference to the figures, a drapery system 10 (or simply system 10) is presented. System 10 is formed of any suitable size, shape, and/or design and is configured to facilitate the attachment of and opening and closing of drapery shade material 60 that may be either a pinch pleat drapery 74, a ripplefold drapery 72, and/or any other drapery or shade material known in the art, to a drapery support rod 20 while providing an appealing aesthetic appearance as well as smooth, quiet and effective operation.

In the arrangement shown, as one example, the system 10 includes the following components, among others: drapery support rod 20 having segments joined by splice connectors 80, rings 40 having an exterior surface 47, interior surface 48, sides 50, hollow interior 52, an attachment member 54, and a shade material 60, among other parts, components and features as are described herein. In one arrangement, drapery support rod 20 is connected to brackets positioned at and/or near the outward ends 22/24 of drapery support rod 20, and/or at the approximate middle, and/or intermediate point 26, of drapery support rod 20, that connect drapery support rod 20 to the structure that supports drapery support rod 20 such as the wall of a building and/or house.

Drapery Support Rod 20:

With reference to the figures, a first embodiment is presented. With reference to the figures, in one arrangement, system 10 is configured to be used in association with a drapery support rod 20. Drapery support rod 20 is formed of any suitable size, shape, and/or design and is configured to support the shade material 60 (e.g., pinch pleat drapery 74 and/or ripplefold drapery 72) while allowing rings 40 to be connected to the upper edge 62 of shade material 60 to be moved between an opened position and a closed position.

Drapery support rod 20 may be any form of a rotating member such as a rod, tube, threaded bar, and the like. In the arrangement shown, as one example, drapery support rod 20 is a generally elongated member that extends a length between a first end 22 and a second end 24 and has a generally cylindrical exterior surface 32. However any other size, shape, and/or design is hereby contemplated such as square, rectangular, oval, hexagonal, octagonal, and/or any other shape, as well as decorative shapes therein such as rope-shaped, ridged, grooved, and/or any other shape or configuration.

In the arrangement shown, as one example, drapery support rod 20 includes a helical guide 36 extending along the exterior surface 32 of the drapery support rod 20. Helical guide 36 can either be grooves, indentations, protrusions, threads and/or any other feature or the like, as is described herein. Helical guide 36 may be ground and/or machined into the surface of drapery support rod 20, cast into the surface of drapery support rod 20 when formed, created by deforming the drapery support rod 20, deposited onto the surface of drapery support rod 20, and/or created by any other means and/or methods known in the art. In one or more embodiments, helical guide 36 may be created, for example, by applying high pressure to the exterior surface 32 while rotating the drapery support rod 20 to deform the material along the helical path. In some implementations, the deformation creates a helical indentation in the exterior surface of the tube and a helical protrusion in the interior surface of the tube.

The helical guide 36 can have a left-hand helical structure, a right-hand helical structure, or both, or a plurality or combination of left-hand helical structures and/or right-hand helical structures. For example, as in the arrangement shown, in one or more embodiments, drapery support rod 20 may include a first segment 28 having a right hand helical structure joined with a second segment 30 having a left hand helical structure (or vice-versa). In this arrangement, rotation of the drapery support rod 20 in a first direction causes rings 40 to travel toward an intermediate point 26 of drapery support rod 20, where the segments 28 and 30 are joined; thereby closing the drapery. Conversely, rotation of the drapery support rod 20 in the other direction causes rings 40 to travel away from the intermediate point 26 of drapery support rod 20; thereby opening the drapery.

In various embodiments, rotation of drapery support rod 20 may be manual and/or motorized. In some arrangements, drapery support rod 20 may be a manual drapery support rod 20, in that the drapery support rod 20 is manually rotated by a person, for example by moving and/or pulling an attached opening and/or closing mechanism such as a pull cord, beaded cord and/or chain or the like, which engages with the drapery support rod 20.

Additionally or alternatively, in one or more arrangements, rotation of drapery support rod 20 may be performed by operation of a motor assembly to facilitate opening and closing of the shade material 60. Such motor assembly may be any suitable size, shape, and/or design and is configured to facilitate motorized rotation of drapery support rod 20. A motor assembly may have a motor mounted either inside or outside the drapery support rod 20. For example, in one or more embodiments, a motor is mounted inside the drapery support rod 20 and generally concealed from plain view. Other components, such as axles and bearings, may also be located inside the drapery support rod 20. Rotation by a motor assembly may be responsive to a hardwired control switch, wireless remote, and/or one or more devices communicatively connective to the motor assembly (e.g., via a communication network).

One or more embodiments may utilize various systems and apparatuses known in the art for motorized rotation of support rods and/or control thereof such as those presented in U.S. Pat. No. 9,095,908 entitled ROTATABLE DRIVE ELEMENT FOR MOVING A WINDOW COVERING; U.S. Pat. No. 9,999,313 entitled MOTORIZED DRAPERY APPARATUS, SYSTEM AND METHOD OF USE; U.S. Pat. No. 10,285,527 entitled MOTORIZED DRAPERY APPARATUS WITH BATTERIES POSITIONED IN THE BRACKETS, and all related patents and applications, all of which are commonly owned by Applicant, all of which are fully incorporated by reference herein, as well as other configurations of motorized drapery rods made by other manufacturers such as, by way of example, the motorized "Cordoba" and "Granada" drapery rods offered by Forest Drapery Hardware, of 2500 Donn Drive, Cartersville GA 30120, among countless others, which are all incorporated by reference.

Drapery support rod 20 may be attached to a wall or structure by a set of brackets (not shown). Brackets may be any suitable size, shape, and/or design and are configured to attach drapery support rod 20 to a wall or other structure. As an illustrative example, in one or more embodiments, brackets may include a mounting plate, a support arm, and a collar. The mounting plate may be configured to attach the brackets to the wall and/or other structure. The support arm is configured to extend the collar away from the wall and/or other structure. The collar may be configured to facilitate connection to drapery support rod 20 while allowing rotation of drapery support rod 20. Generally, two brackets are utilized to attach drapery support rod 20 to a wall and/or structure, however, any number of brackets are hereby contemplated for use, as is any configuration of brackets.

Shade Material 60:

Shade material 60 may be any suitable size, shape, and/or design and is configured to be movable between an opened position and a closed position and preferably providing a pleasing aesthetic appearance. In the arrangement shown, as one example, shade material 60 is formed of a panel of drapery fabric that extends vertically between an upper edge 62 and a lower edge 64, and extends horizontally between opposing sides 66, and includes a front surface 68 and a rear surface 70. In some various embodiments, shade material 60 may include, for example, pinch pleat drapery material 74, ripplefold drapery material 72, and/or any other drapery materials known in the art.

In the arrangement shown, as one example, a ripplefold drapery 72 shade material 60 is attached to a set of rings 40 at a number of positions along upper edge 62 and suspended by rings 40 on drapery support rod 20. The ripplefold drapery 72 begins as a generally flat and planar piece of fabric and/or material. This fabric is then installed on drapery support rod 20 in a manner that causes the material of ripplefold drapery 72 to form a series of ripples and/or curves that provide the desired fullness and aesthetic appearance. That is, ripplefold drapery 72 forms a continuous S-shaped curved shape, or, said another way, a sinusoidal curved member formed by a plurality of ripples connected in end-to-end fashion when viewed from above and/or below.

Ripplefold drapery 72 is generally not self-limiting. Or, said another way, ripplefold drapery 72 is not-fully extended when it is fully opened. Instead, the fullness, and the desired aesthetic appearance of ripplefold drapery 72 is formed by limiting the distance between connection points to drapery support rod 20 such as through the use of a lead 56. The greater the amount of extra material between adjacent connection points, the greater the fullness of the ripples. The opposite is true as well. The lesser the amount of extra material between adjacent connection points, the lesser the fullness of the ripples.

Due to the configuration of ripplefold drapery 72, shade connection members 76 (e.g., drapery pins) are installed at spaced intervals along the upper edge 62 of ripplefold drapery 72. It is desirable to have ripplefold drapery 72 extend in a curved and/or sinusoidal manner along its side 66 to side 66 length when it is fully opened. To facilitate this configuration, shade connection members 76 may installed in a pattern where adjacent shade connection members 76 point in opposite directions, as is further described herein, so as to help induce the desired shape and/or curvature of the material of ripplefold drapery 72.

Additionally or alternatively, in one or more embodiments, shade material 60 may include pinch pleat drapery 74. Pinch pleat drapery 74 begins as a generally flat and planar piece of fabric and/or material. This fabric is then gathered and pinched together at its upper edge 62 in a plurality of pleats that are generally equally spaced across the side 66 to side 66 length of pinch pleat drapery 74. These pleats provide pinch pleat drapery 74 with a controlled aesthetic appearance of fullness and consistency when the pinch pleat drapery 74 is fully opened as well as when pinch pleat drapery 74 is fully closed.

Pinch pleat drapery 74 may also be limited and/or self-limiting by the configuration of the pinch pleat drapery 74. That is, when the pinch pleat drapery 74 is fully opened, the material of the pinch pleat drapery 74 may generally be fully extended. In this fully opened and/or fully extended position, pinch pleat drapery 74 still has a desired fullness due to the material gathered by pleats. When pleats are only gathered and/or stitched adjacent the upper edge 62 of pinch pleat drapery 74, the material tends to fan-out and/or extend outward as it extends downward. The self-limiting nature of pinch pleat drapery 74 eliminates the need for a length-limiting component, such as a lead 56, as is often used with ripplefold drapery 72.

Rings 40:

In one arrangement, system 10 is configured to be used in association with a drapery support rod 20 having a plurality of rings 40 positioned around drapery support rod 20. Rings 40 slide along the length of drapery support rod 20 as drapery support rod 20 rotates, thereby opening and closing shade material 60. Rings 40 are formed of any suitable size, shape, and/or design and are configured to be positioned around drapery support rod 20 as well as facilitate a connection to the upper edge 62 of shade material 60 while allowing shade material 60 to be moved between an opened position and a closed position.

In the arrangement shown, as one example, rings 40 have an exterior surface 47, an interior surface 48, and sides 50. In the arrangement shown, as one example, exterior surface 47 of rings 40 is generally cylindrical in shape with a generally flat and smooth convex curved surface, however any other size, shape and configuration is hereby contemplated for use.

In one arrangement, interior surface 48 is formed of a non-metallic material so as to provide quiet operation as rings 40 move along the length of drapery support rod 20. This is particularly important when drapery support rod 20 is formed of a metallic material as metal-on-metal contact can be particularly loud and undesirable. In one arrangement, this non-metallic material is partially compressible and shock-absorbing, or more compressible or more shock-absorbing than the metallic material that forms drapery support rod 20, which has the effect of reducing noise and vibration and providing smoother operation. In one arrangement, this non-metallic material has a low coefficient of friction so as to allow smooth operation and smooth sliding along the length of drapery support rod 20 with minimal or limited resistance and friction. In one arrangement, this non-metallic material is self-lubricating so as to maintain a low coefficient of friction so as to allow smooth operation and smooth sliding of rings 40 with minimal or limited resistance and friction when the drapery support rod 20 is rotated.

In the arrangement shown, as one example, sides 50 of rings 40 are generally flat and connect at their outward end to exterior surface 47 and connect at their inward end to interior surface 48. In the arrangement shown, as one example, opposing sides 50 extend in approximate parallel spaced relation to one another. In this way, the generally flat sides 50, coupled with the generally cylindrically shaped exterior surface 47 with a generally parallel spaced interior surface 48, forms a narrow generally cylindrically shaped member that forms rings 40. In the arrangement show, as one example, the outward ends and interior ends of sides 50 connect to the outward edges of exterior surface 47 and outward edges of interior surface 48 in curved and/or chamfered corners so as to provide a smooth transition there between. However any other size, shape and configuration is hereby contemplated for use. In the arrangement shown, as one example, the combination of exterior surface 47, interior surface 48 and sides 50 of rings 40 form a hollow interior 52.

In the arrangement shown, as one example, rings 40 have a hollow interior 52 that is configured to receive drapery support rod 20 therein. In the arrangement shown, when viewed from a side of rings 40, hollow interior 52 is generally cylindrically shaped and defined by the interior surface 48. In the arrangement shown, as one example, the hollow interior 52 is oversized as compared to the exterior size and shape of drapery support rod 20 so as to allow rings 40 to easily slide over the exterior surface 32 of drapery support rod 20 without binding and with minimal contact and friction. However, any other shape and/or configuration is hereby contemplated for use.

Attachment Member 54:

In the arrangement shown, as one example, rings 40 include an attachment member 54. Attachment member 54 is formed of any suitable size, shape, and/or design and is configured facilitate the connection of adjacent rings 40 by way of a lead 56 so as to set the maximum spacing between adjacent rings 40 so as to set the fullness of shade material 60 connected to rings 40. However, it is recognized, when a pinch pleat drapery 74 is used, setting the maximum spacing between adjacent rings 40 using a lead 56 may be redundant as the pinch pleat drapery 74 is self-limiting with panels and pleats, however in some applications it may still be desirable to set the maximum spacing between rings 40 using shade connection members 58 and a lead 56.

In the arrangement shown, as one example, attachment member 54 is formed of a snap-fit feature that is sized and shaped to frictionally receive and hold-on to lead 56, which in the arrangement shown is a string and/or cord with a plurality of spaced features, which in the arrangement shown, as one example, are spherical beads that are positioned along the length of lead 56. In one or more embodiments, for example, attachment member 54 is formed of a pair of arms configured and arranged to receive and hold the feature of the lead 56 with frictional and locking engagement.

Shade Connection Member 58:

In one or more arrangements, rings 40 include a shade connection member 58 for connecting to an upper edge 62 of a shade material 60. The shade connection member 58 may be any suitable size, shape, and/or design and is configured for connecting the rings 40 to the upper edge 62 of the shade material 60. As one example, in some embodiments, the shade connection member 58 may include a drapery pin (not shown). The drapery pin is configured to facilitate connection with a hole on a top edge of a drapery material so the drapery material may be hung on and held by the drapery pin. In some embodiments, the shade connection member 58 is adjustable to connect with and hold a shade material 60 at a number of different angles. Adjustability of a shade connection member 58 may be desirable, for example, to facilitate deployment of ripplefold drapery 72 to have an aesthetically pleasing S-shaped curved shape.

Driver Rings, Idler Rings, & Partial Driver Rings:

In one or more embodiments, interior surface 48 of rings 40 may be sized and shaped to operate as idler rings 44, driver rings 42, partial driver rings 46, and/or a combination thereof. The idler rings 44 generally have a smooth interior surface that is not significantly affected by the rotating drapery support rod 20 and its helical guides 36. In contrast, the driver rings 42 are sized and shaped to engage the helical guide 36 of the rotating drapery support rod 20. As one example, a driver ring 42 may have one or more members configured to ride inside of helical guide 36. As the drapery support rod 20 is rotated, the driver ring 42 is laterally moved by the helical guide 36 across the length of the drapery support rod 20, thereby opening and/or closing the shade material 60 hung on the idler rings 44 and the driver rings 42. Partial driver rings 46 have a member configured to engage with the helical guides 36 of the drapery support rod 20 but are configured to permit the partial driver ring 46 to slip over helical guides 36 if sufficient force is applied.

In a one-way opening drapery application, as one example, a plurality of idler rings 44 may be positioned around the drapery support rod 20 on the non-opening side. The number of idler rings 44 needed depends on the length of the drapery support rod 20 as well as the property of the materials of the shade material 60. Positioned on the opening side of the plurality of idler rings 44 is a driver ring 42. Positioned on the opening side of the driver ring 42 is a partial driver ring 46.

In a center opening and/or center closing drapery application, as one example, a plurality of idler rings 44 may be positioned around the drapery support rod 20 on the outward sides of drapery support rod 20. The number of idler rings 44 needed depends on the length of the drapery support rod 20 as well as the property of the materials of the shade material 60. Positioned on the inward side of the plurality of idler rings 44 is a driver ring 42. Positioned on the inward side of the driver ring 42 is a partial driver ring 46.

The arrangement of a plurality of idler rings 44 followed by a driver ring 42 followed by a partial driver ring 46 provides operational advantages, namely a partial driver ring 46 drives itself along the length of drapery support rod 20 while allowing the driver ring 42 to crush the shade material 60 at the fully closed position, which causes the driver ring 42 to either directly engage the partial driver ring 46 and/or thereby engage in close proximity the partial driver ring 46, which has the effect of forcing an increased amount of shade material 60 at the fully closed position, which has the effect of reducing light gaps in the shade material 60 at the fully closed position.

As the drapery support rod 20 rotates, the rings 40 are driven along the length of the drapery support rod 20 to move the shade material 60 between an opened and a closed position. More specifically, driver ring 42 engages the helical guides 36 of drapery support rod 20 which causes linear movement of driver ring 42 along the length of drapery support rod 20. As the driver ring 42 linearly moves along drapery support rod 20, driver ring 42 has a tendency to push and/or pull idler rings 44 and partial driver ring 46 as the shade material 60 moves between the opened position and the closed position.

Splice Connector 80:

In one or more embodiments, multiple segments (e.g., 28/30) are joined together by one or more splice connectors 80 to form a drapery support rod (e.g., 20). In one or more embodiments, multiple drapery support rod 20 segments 28/30 are joined together by one or more splice connectors 80. In the arrangement shown, as one example, two segments 28 and 30 of drapery support rod 20 are joined by splice connector 80. However, in one or more embodiments, multiple splice connectors 80 may be used to connect three, four, five, or any number of segments 28/30 together without limit to form drapery support rod 20. Splice connector 80 is formed of any suitable size, shape, design and is configured to connect to and hold two segments 28/30 of drapery support rod 20 together.

As one example, in the arrangement shown, splice connector 80 is generally cylindrical shaped member and extending a length between first and second opposing ends 82 and 84. Splice connector 80 includes a first section 88 extending from the first end 82 to an intermediate point 86 and a second section 90 extending from the intermediate point 86 to the second end 84. Each section 88 and 90 is configured to engage and connect with an end of a respective drapery support rod 20 segment 28/30. In the shown arrangement, as one example, sections 88 and 90 have exterior surfaces 92 configured and arranged to engage and connect with interior surface 34 of drapery support rod 20 segment 28/30.

Features 108:

In one or more arrangements, exterior surface 92 of splice connector 80 includes one or more features 108 configured to engage or mate with the one or more features on the interior surface 34 of drapery support rod 20 when splice connector 80 is inserted into an end 22/24 of support rod 20. Such features 108 are formed of any suitable size, shape, and/or designs suitable to engage and connect with interior surface 34 of drapery support rod 20. For example, as previously indicated, in one or more arrangements, helical guide 36 of drapery support rod 20 forms a helical indentation in the exterior surface 32 of the support rod 20 and a helical protrusion in the interior surface 34 of drapery support rod 20. In one or more embodiments, exterior surface 92 of splice connector 80 includes surface features 108 (e.g., helical recesses and/or protrusions), which are configured to match up with the helical protrusions and/or recesses on interior surface 34 to facilitate accurate, tight and secure joining of the splice connector 80 with a drapery support rod 20 segment 28/30. Conversely, in one or more embodiments, exterior surface 92 of splice connector 80 include protruded surface features 108 (e.g., helical protrusions) configured to match up with recesses in interior surface 34 to facilitate joining of the splice connector 80 with a drapery support rod 20 segment 28/30.

In Operation: In one or more embodiments, helical surface features 108 on the exterior surface 92 of splice connector 80 may operate similar to threading on a screw and cause an end of splice connector 80 to be pulled into an interior of drapery support rod 20 as splice connector 80 is rotated. For example, when splice connector 80 is inserted in an end 22/24 of a drapery support rod 20 segment 28/30 and rotated, helical surface features 108 on the exterior surface 92 of splice connector 80 engage helical protrusions on interior surface 34 of segment 28/30. As splice connector 80 is further rotated, helical surface features 108 on the exterior surface 92 slide against helical protrusions on interior surface 34 to drive splice connector 80 further into segment 28/30.

In one or more embodiments, drapery support rod 20 may be configured to have a smooth interior surface 34. In some implementations, exterior surface 92 of splice connector 80 includes one or more surface features 108 configured to engage with the smooth interior surface 34 of drapery support rod 20. The features may be any suitable size, shape, and/or designs configured to facilitate insertion of splice connector 80 into drapery support rod 20 and inhibit removal of the splice connector 80 once inserted. In one of more embodiments, for example, helical surface features 108 (e.g., protrusions and/or recesses) on the exterior surface 92 of splice connector 80 may be configured to engage with a smooth interior surface 34 with tight and close tolerances that create frictional forces that securely hold the two components together. As splice connector 80 is slid and/or rotated within a segment 28/30 having a smooth interior, frictional forces hold splice connector 80 into segment 28/30.

In the arrangement shown, splice connector 80 is configured with helical surface features 108 on exterior surface 92 configured to connect and join a first drapery support rod 20 segment 28/30 having a right hand helical guide with a second drapery support rod 20 segment 28/30 having a left hand helical guide. However, the embodiments are not so limited. It is contemplated that splice connector 80 may be configured with suitable helical surface features 108 for joining two drapery support rod 20 segments 28/30 having left hand helical guides and/or two drapery support rod 20 segments 28/30 having right hand helical guides.

Stop Member 104:

In one or more embodiments, splice connector 80 includes a stop member 104 configured to engage an end of drapery support rod 20 when section 88/90 of splice connector 80 is fully inserted. Stop member 104 is formed of any suitable size, shape, design and is configured to engage a portion of drapery support rod 20 when fully inserted. In the shown arrangement, as one example, the splice connector 80 includes a stop member 104 protruding from the exterior surface 92 and extending around a circumference of the splice connector 80 at the intermediate point 86. When splice connector 80 is fully inserted in an end 22/24 of a drapery support rod 20 segment 28/30, engagement between stop member 104 and an end 22/24 of drapery support rod 20 segment 28/30, may create frictional and tensional forces that assist to hold splice connector 80 and drapery support rod 20 segment 28/30 together.

In the arrangement shown, as one example, stop member 104 is positioned at the approximate middle of splice connector 80. In the arrangement shown, as one example, stop member 104 is a generally narrow cylindrical ring and/or protrusion that extends outward from exterior surface 92 of splice connector 80 a distance. In the arrangement shown, as one example, stop member 104 extends outward from exterior surface 92 a distance such that the exterior surface of stop member 104 is approximately flush with exterior surface 32 of support rod 20 when support rod 20 is attached to splice connector 80. However any other arrangement is hereby contemplated for use. As one example, stop member 104 may be slightly recessed to exterior surface 32 of support rod 20. As another example, stop member 104 may be slightly protruding from the exterior surface 32 of support rod 20. In this way, stop member 104 extends outward from exterior surface 92 of splice connector 80 and provides a rigid, clean, strong and sturdy stop at the fully inward position for support rod 20 when support rod 20 is attached to splice connector 80.

Support Features 96:

In one or more embodiments, splice connector 80 may include one or more support features 96. Support features 96 are formed of any suitable size, shape, and/or design and are configured to engage with drapery support rod 20 and prevent rotation, tilting, and/or misalignment of splice connector 80 relative to drapery support rod 20 once splice connector 80 is fully inserted. In the shown arrangement, as one example, splice connector 80 includes a pair of support features 96 on exterior surface 92 adjacent each side of stop member 104 with one support member on each opposing side of splice connector 80. That is, one support feature 96 is positioned on each side (left/right) of stop member 104 and on each of the forward and back (as is shown in the figures) sides of splice connector 80. However any other arrangement is hereby contemplated for use.

In the arrangement shown, as one example, these inward positioned support features 96 are centered on a seamline that extends through the approximate middle of splice connector 80. In this arrangement, the seamline extends through the middle of planar sides 110 of splice connector 80. In this example arrangement, support features 96 curve from the exterior surface of planar sides 110 to their apex and/or tangent point that is positioned at the seamline. In this arrangement, the seamline itself serves as the apex and/or tangent point of the smooth but cylindrically curved planar sides 110. This configuration allows splice connector 80 to be removed from a mold that separates at the seamline (after a portion of the mold is removed from the hollow interior of the ends of splice connector 80 that forms the hollow interior and support).

In some embodiments, the shoulder shaped support features 96 may be configured to mate with corresponding recesses and/or other features on interior surface 34. Alternatively, the support features 96 protruding outward from planar sides 110 engage the interior surface 34 of support rod 20 and at the point support rod 20 engages stop member 104 thereby providing support for the inward most end of support rod 20 and thereby preventing tilting and/or wobbling of one segment 28/30 relative to another segment 28/30 and/or splice connector 80. This is particularly important when using splice connector 80 with smooth support rods 20 as support features 96 engage and support the interior surface 34 of smooth support rods 20. In this way, support features 96 facilitate the installation of splice connector 80 into support rods 20 that are smooth as well as support rods 20 that have helical features therein.

In the arrangement shown, as one example, splice connector 80 also includes a pair of outward positioned support features 96 that are positioned adjacent the outward ends 82/84 of splice connector 80. Like the inward positioned support features 96, the outward positioned support features 96 are centered on a seamline that extends through the approximate middle of splice connector 80. In this way, these outward positioned support features 96 are positioned on opposite sides from one another on splice connector 80. In this arrangement, the seamline extends through the middle of planar sides 110 of splice connector 80. In this arrangement, support features 96 curve from the exterior surface of planar sides 110 to their apex and/or tangent point that is positioned at the seamline. In this arrangement, the seamline itself serves as the apex and/or tangent point of the smooth but cylindrically curved planar sides 110. This configuration allows splice connector 80 to be removed from a mold that separates at the seamline (after a portion of the mold is removed from the hollow interior of the ends 82/84 of splice connector 80 that forms the hollow interior and support members 100 of splice connector 80).

The presence of these outward positioned support features 96 help to maintain alignment of splice connector 80 with respect to the length of support rod 20. In addition, the combination of the inward positioned support features 96 with the outward positioned support features 96 provides highly accurate alignment of the length of support rod 20 with respect to the length of splice connector 80. This helps to alleviate any arc, curve and/or angle at the intersection of opposing segments 28/30 of support rod 20.

As another example, in some embodiments, splice connector 80 includes a number of tooth and/or gear-shaped locking members configured to mate with recesses and/or other features on interior surface 34 of support rod 20. In some other embodiments, the support features 96 may not mate with a corresponding recess and/or feature. Rather, the support features 96 may be configured, for example, to produce frictional forces sufficient to inhibit movement between interior surface 34 of support rod 20 and exterior surface 92 of splice connector 80.

Tapered Portion 98:

In one or more embodiments, splice connector 80 includes a tapered portion 98 that reduces in diameter in a direction away from the intermediate point 86 toward ends 82/84. The tapered portion 98 may be any suitable size, shape, design configured to ease insertion and frictional forces between interior surface 34 of support rod 20 and exterior surface 92 as splice connector 80 is inserted in the end 22/24 of drapery support rod 20. In the arrangement shown, as one example, tapered portion 98 may be formed of a chamfered and/or inwardly angled section at the ends 82/84 of splice connector 80.

Additionally or alternatively, in one or more embodiments, an interior of drapery support rod 20 for segment 28/30 may be tapered. In other words, drapery support rod 20 segment 28/30 may reduce in diameter as the segment extends further from the end 22/24 of the segment 28/30. As splice connector 80 is inserted further into segment 28/30, the reduced diameter may apply compressive force on splice connector 80; thereby aiding to attach splice connector 80 to segment 28/30.

Support Members 100:

In one or more embodiments, splice connector 80 may be generally tubular shaped having a hollow interior with an interior surface 94. In some implementations, splice connector 80 includes a number of support members 100 in the hollow interior of splice connector 80. The support members 100 are formed of any suitable size, shape, design and are configured to oppose compressive forces exerted on the exterior surface 92, prevent deformation of splice connector 80, and/or resist bending of all or a portion of splice connector 80. The presence of support members 100 also reduces the weight and overall mass and amount of material used by splice connector 80 as opposed to having a solid splice connector 80.

In the arrangement shown, as one example, stop member 104 extends across the entire hollow interior of splice connector 80 thereby separating the hollow interior into opposing halves. In this way, stop member 104 forms a center wall across the hollow interior of splice connector 80. In the arrangement shown, as one example, splice connector 80 includes a number of support members 100 extending outward from a center axis and/or center wall of splice connector 80 to the interior surface 94. The support members 100 extend to opposing sides of interior surface 94 thereby providing support across the hollow interior of splice connector 80. In the arrangement shown, as one example, support members 100 extend in a spoke-like pattern outward from the center axis to the interior surface 94. In the arrangement shown, as one example, support members 100 extend outward from the center wall, and/or stop member 104, a distance before terminating at or before end 82/84.

In one or more arrangements, from a cross sectional view of splice connector 80, free space between support members 100 may be wedge or pie shaped. In one or more embodiments, support members 100 may extend along at portion of the length of the splice connector 80 to form a supported portion configured to oppose compressive forces exerted on the exterior surface 92, prevent deformation of splice connector 80, and/or resist bending of all or a portion of splice connector 80. In one arrangement, as is shown, support members 100 end at or before cutouts 106 in end 82/84 thereby allowing the ends 82/84 to flex inward to ease insertion of splice connector 80 into an end 22/24 of support rod 20.

In the arrangement shown, as one example, support members 100 are shown as generally flat and straight wall-like members. However, it is contemplated that support members 100 may have other shapes as well. As another example, in one or more embodiments, support members may be implemented with a honeycomb shape, box shape, square shape, tube shape, cone shape, or any other shape or combination thereof.

Compressible Sections 102:

In one or more embodiments, splice connector 80 may include one or more compressible sections 102 that are unsupported by support members 100 and/or are supported to a lesser degree by support members 100. Such compressible sections 102 may be any suitable size, shape, and/or design configured to permit splice connector 80 to be compressed toward interior surface 94 when inserted in an end of a drapery support rod 20 segment 28/30. In the arrangement shown, as one example, support members 100 of splice connector 80 are tapered towards the ends 82/84 of splice connector 80 to permit the ends 82/84 to be compressed. Compression of a portion of splice connector 80 may help to hold splice connector 80 with drapery support rod 20 segments 28/30 once connected. Additionally or alternatively, in one or more embodiments, splice connector 80 may include one or more cutouts 106, extending inward from the end 82/84 in the compressible section 102, to permit the compressible section 102 to compress more easily. In the arrangement shown, as one example, cutouts 106 are formed of slots and/or cuts from exterior surface 92 through to interior surface 94 that extend from end 82/84 inward toward stop member 104 a distance. The cutouts 106 provide for enhanced flexion of the end 82/84 of splice connector 80 so as to accommodate dimensional variance and deformities in the end 22/24 of support rod 20.

Planar Side Sections 110:

Splice connector 80 is formed of any suitable materials and/or processes configured to provide a splice connector 80 having the features and characteristics described herein. In one or more embodiments, splice connector 80 may be manufactured using a molding process. As an example, the mold of splice connector 80 may be formed of two separable halves. With the halves of the mold connected, thereby forming the seamline between the two halves, material of splice connector 80 is poured into the mold and allowed to harden (e.g., by cooling and/or chemical reaction). After sufficient hardening of the material, halves of the mold are separated and the resulting splice connector 80 is removed. There is also a need to remove an insert from the end of the splice connector 80, which is used to form support members 100.

In some embodiments, the splice connector 80 and/or features may be sized and shaped to permit the splice connector 80 to be formed in a mold and permit halves of the mold to be pulled apart after hardening. In the shown arrangement, as one example, splice connector 80 includes planar sides 110 to facilitate manufacture of splice connector 80 in a molding process having opposing mold halves. For example, planar side sections may facilitate separation of mold halves without catching on helical surface features 108 on exterior surface 92 of the splice connector 80. Notably, while the term "planar" is used and while planar sides 110 may be flat and planar in shape, in the arrangement shown, planar sides 110 are curved and curve from their upper and lower ends in a generally smooth and cylindrical manner toward the seamline where planar sides 110 reach their apex and/or tangent point. This cylindrical curvature still allows the separation of mold halves without interference.

Illustrative Applications:

The disclosed arrangements are thought to be beneficial and applicable to a wide number of applications. For example, in some embodiments, the splice connector 80 may provide for easier installation by allowing the assembly of long drapery support rods 20 formed of a plurality of segments 28/30. For instance, the use of splice connectors 80 to assembly a longer drapery support rod 20 from multiple segments 28/30 may make it easier to transport system components on the site of installation, e.g., through hallways, stairwells, and/or elevators of a building. Splice connectors 80 may also similarly reduce the cost and complexity of shipping and transportation of components (e.g., by shipping in standardized and/or more compact containers).

In one or more embodiments, splice connectors 80 may also be used to customize installation to address non-uniformity and/or defects in materials. For example, it can be difficult to manufacture materials in longer lengths that are perfectly strait. In some arrangements, a splice connector 80 may be used to a join segments 28/30 in an alignment that compensates for material curvature to produce a straighter drapery support rod 20. For example, an installer may align four slightly curved segments so a first segment curves slightly to the left, a second segment curves slightly to the right, a third segment curves slightly to the left, and a fourth segment curves slightly to the right. In this manner, curvature of segments 28/30 can be negated to provide straighter drapery support rods 20 over longer lengths.

Conversely, in one or more embodiments, splice connectors 80 may be configured to facilitate curving of a drapery support rod 20, e.g., to accommodate walls and/or in applications that are not perfectly straight. For example, in one or more embodiments, a splice connector 80 may be formed of a material that has some give and/or bend to it. Suitable materials may include but are not limited to, for example, plastic, rubber, composite UHMW material, and the like. This give and/or ability to slightly bend allows for the drapery support rods 20 to be installed on walls and/or in applications that are not exactly perfectly straight, and/or allow for less-precise alignment during installation. In some implementations, the system 10 may include a wall mounted support member configured to support the drapery support rod 20 nearby the splice connector 80 to prevent sagging. For instance, a drapery support rod 20 may rest and/or rotate in ide in a U-shaped channel provided by a wall mount support at an intermediate point 26 where two segments are joined. While the disclosed arrangements are primarily discussed with reference to drapery support rods, the embodiments are not so limited. Rather, it is contemplated that the splice connector 80 may be used to connect segments of shorter length materials for various other applications utilizing longer length components.

Example Installation:

To highlight some various features of the disclosed arrangements, an example process for assembly and installation of a drapery system is described. However, it is recognized that other various processes and procedures may be utilized in addition to or in lieu of the example process(s) described herein.

In one or more embodiments, a drapery system is installed using a segmented drapery support rod 20. The segmented drapery support rod 20 is typically provided as a plurality of separated support rod segments 28/30 along with one or more splice connectors 80. In one more embodiments, the separated support rod segments 28/30 have helical guides 36. As previously discussed, fully assembled drapery support rod 20 may have helical guides 36 with right-hand rotation, left-hand rotation, or both.

An installer may orient and connect support rod segments 28/30 differently depending on the type of installation. For example, in a one-way opening drapery application, an installer would orient and connect support rod segments 28/30 so all support rod segments 28/30 have helical guides 36 with the same direction of rotation (e.g., right-hand rotation or alternatively left-hand rotation). As another example, in a center opening and/or center closing drapery application, an installer would orient and connect support rod segments 28/30 so the support rod segments 28/30 on one end of the fully assembled drapery support rod 20 have one rotation (e.g., right-hand rotation) and the support rod 20 segments 28/30 on other end of the fully assembled drapery support rod 20 have the other rotation (e.g., left-hand rotation).

As previously mentioned, in some embodiments, helical guides 36 may include a helical protrusion and/or recess in an interior surface 34 of drapery support rod 20. Further, splice connector 80 may have one or more helical shaped features 108 configured to engage the helical protrusion and/or recess. In such arrangement, an installer would orient splice connector 80 so rotation of helical surface features 108 on exterior surface 92 of splice connector 80 match the rotation of the helical protrusion and/or recess of interior surface 34 of drapery support rod 20 segments 28/30 to be connected. Depending on the rotation of the helical protrusion and/or recess of interior surface 34 of drapery support rod 20 segments 28/30 to be connected, first and second sections 88 and 90 of splice connector 80 may have helical surface features 108 with the same rotation or with different rotations.

Drapery support rod 20 segments 28/30 are operably connected together by an installer using one or more splice connectors 80. For example, after orienting splice connector 80 and ensuring proper helical rotation, first end 82 of splice connector 80 is inserted into first end 22 of a first segment 28. Splice connector 80 is rotated relative to the first segment 28 to cause helical surface features 108 of the splice connector 80 to engage helical features (e.g., recess and/or protrusion) on the interior surface 34 of the first segment 28. As rotation of splice connector 80 continues, helical surface features 108 slide along and engage helical features on the interior surface 34 and cause splice connector 80 to be pulled into the first segment 28. In one or more embodiments, as splice connector 80 nears full insertion into the first segment 28, tapering and/or compression of the splice connector 80 may cause friction between splice connector 80 and the first segment 28 to increase. In one or more embodiments, when splice connector 80 is fully inserted into the first segment 28, stop member 104 engages with first end 22 of first segment 28 and increase frictional forces between splice connector 80 and the first segment 28. Additionally or alternatively, when splice connector 80 is fully inserted into the first segment 28, a support feature 96 of splice connector 80 may engage with the interior surface 34 of support rod 20 and/or a corresponding feature of the first segment 28 to lock splice connector 80 and the first segment 28 together. In this manner, first section 88 of splice connector 80 is operably connected to the first segment 28.

After connecting first section 88 of splice connector 80 to first segment 28 of drapery support rod 20, second section 90 of splice connector 80 is operably connected to second segment 30 to form the drapery support rod 20. In connecting second section 90 and second segment 30, second section 90 is inserted into second segment 30 and rotated. As described with reference to first section 88 and first segment 28, rotation of second section 90 relative to second segment 30 causes second section 90 to be pulled into second segment 30 until it is fully inserted and second segment 30 is operably connected to second section 90. In this manner, the first segment 28 and the second segment 30 are operably connected together by splice connector 80.

After all segments of drapery support rod 20 are connected, drapery support rod 20 is connected to a wall and/or structure by two or more brackets, rings 40 are positioned on drapery support rod 20 and connected to an upper edge 62 of shade material 60 panel(s), as previously described, to suspend shade material 60 from drapery support rod 20.

The drapery support rod 20 formed of segments 28/30 and a splice connector 80 may be used as a rotating drapery rod that is powered and drives rings 40 open and closed. Or alternatively the drapery support rod 20 may be used as a manual stationary and non-rotating drapery support rod 20.

When installing splice connector 80 into smooth hollow tube, the ends 82/84 are aligned with the ends of the segments 28/30 of support rod 20 and forced inward. In doing so, the tapered portion 98 helps ease insertion and the compressible sections 102 compress inward slightly when necessary to facilitate insertion. Once fully inserted, the ends of segment 28/30 are in engagement with the sides of stop member 104 and the exterior surface 92 of splice connector 80 is in engagement with the interior surface 34 of segments 28/30. In addition, the exterior surface of support features 96 are in engagement with the interior surface 34 of segments 28/30 both at the middle of the splice connector 80 adjacent stop member 104 as well as at the outward ends 82/84 of splice connector 80. In this way, the engagement of support features 96 provides accurate alignment of splice connector 80 to segments 28/30 thereby forming a straight and strong drapery support rod 20 formed of splice connector 80 and segments 28/30.

In this way, all of the objectives and more have been met.

What is claimed:

1. A drapery system, comprising:
   a support rod;
   wherein the support rod is an elongated tube having a generally cylindrical exterior surface extending between an opposing first end and a second end;
   wherein the support rod includes a first segment extending from the first end to an intermediate point;
   wherein the support rod includes a second segment extending from the intermediate point to the second end;
   wherein the support rod includes a helical guide structure formed by:
      a first deformation along a first helical path on an exterior surface of the first segment of the support rod; and
      a second deformation along a second helical path on an exterior surface of the second segment of the support rod;
   wherein the first deformation forms a first recess in the exterior surface of the first segment of the support rod along the first helical path;
   wherein the first deformation forms a first protrusion in an interior surface of the first segment of the support rod along the first helical path:
   wherein the second deformation forms a second recess in the exterior surface of the second segment of the support rod along the second helical path;
   wherein the second deformation forms a second protrusion in an interior surface of the second segment of the support rod along the second helical path:
   wherein the support rod includes a splice connector configured and arranged to operably connect the first segment to the second segment at the intermediate point;
   wherein the splice connector is configured to engage the first protrusion of the first segment and engage the second protrusion of the second segment to secure the connection between the first segment to the second segment at the intermediate point:
   a plurality of ring members;
   wherein the plurality of ring members are configured and arranged to attach at and/or near an upper edge of a shade material and suspend the shade material from the support rod;
   wherein one or more rings of the plurality of ring members are configured to engage with the first recess and/or second recess in a manner causing the one or more rings to:
      move the shade material laterally to a closed position in response to rotation of the support rod in a first direction; and
      move the shade material laterally to an open position in response to rotation of the support rod in a second direction.

2. The system of claim 1, wherein the splice connector has an elongated generally cylindrical shape having:
   a first section configured to connect with the first segment; and
   a second section configured to connect with the second segment.

3. The system of claim 1, wherein the splice connector has an elongated generally cylindrical shape having:
   a first section configured to connect with the first segment; and
   a second section configured to connect with the second segment;
   wherein the first section has an external surface having one or more features configured to engage the first protrusion of the interior surface of the first segment; and
   wherein the second section has an external surface having one or more features configured to engage the second protrusion of the interior surface of the second segment.

4. The system of claim 1, wherein the splice connector has an elongated generally cylindrical shape having:
   a first section configured to connect with the first segment; and
   a second section configured to connect with the second segment;
   wherein the first section of the splice connector has a first external surface having a first helical recess configured to engage the first protrusion when the first section is inserted into the first segment; and wherein the second section of the splice connector has a second external surface having a second helical recess configured to engage the second protrusion when the second section is inserted into the second segment.

5. The system of claim 1, wherein the splice connector has an elongated generally cylindrical shape having:
   a first section configured to connect with the first segment; and
   a second section configured to connect with the second segment;
   wherein the first section of the splice connector has a first external surface having a first helical recess configured to engage the first protrusion when the first section is inserted into the first segment;
   wherein the second section of the splice connector has a second external surface having a second helical recess configured to engage the second protrusion when the second section is inserted into the second segment;
   wherein the first protrusion and first helical recess have a right hand helical rotation; and
   wherein the second protrusion and second helical recess have a left hand helical rotation.

6. The system of claim 1, wherein the splice connector has an elongated generally cylindrical shape having:
   a first section configured to connect with the first segment; and
   a second section configured to connect with the second segment;
   wherein the first section of the splice connector has a first external surface having a first helical recess configured to engage the first protrusion when the first section is inserted into the first segment;
   wherein the second section of the splice connector has a second external surface having a second helical recess configured to engage the second protrusion when the second section is inserted into the second segment;
   wherein the first protrusion and second protrusion and first helical recess and second helical recess have a right hand helical rotation.

7. The system of claim 1, wherein the splice connector has an elongated generally cylindrical shape having:
   a first section configured to connect with the first segment; and
   a second section configured to connect with the second segment;
   wherein the first section of the splice connector has a first external surface having a first helical recess configured to engage the first protrusion when the first section is inserted into the first segment;
   wherein the second section of the splice connector has a second external surface having a second helical recess configured to engage the second protrusion when the second section is inserted into the second segment;
   wherein the first protrusion and second protrusion and first helical recess and second helical recess have a left hand helical rotation.

8. The system of claim 1, wherein the splice connector has an elongated generally cylindrical shape having:
   a first section configured to connect with the first segment; and
   a second section configured to connect with the second segment;
   wherein the first section has an external surface having one or more features configured and arranged to engage the interior surface of the first segment and, when the first section is inserted in the first segment, operably connect the first section to the first segment;
   wherein the second section has an external surface having one or more features configured and arranged to engage the interior surface of the second segment and, when the second section is inserted in the second segment, operably connect the second section to the second segment.

9. The system of claim 1, wherein the splice connector has an elongated generally cylindrical shape having:
   a first section configured to connect with the first segment; and
   a second section configured to connect with the second segment;
   wherein the splice connector further includes a stop feature positioned between the first section and second section.

10. The system of claim 1, wherein the splice connector further includes a support feature, wherein the support feature is configured and arranged to engage with at least one feature on an internal surface of the first segment.

11. The system of claim 1, wherein the splice connector further includes at least one support feature, wherein the at least one support feature is a protrusion, wherein the at least one support feature is configured and arranged to engage with a corresponding feature on an internal surface of the first segment, and the corresponding feature is a recess configured to mate with the at least one support feature.

12. The system of claim 1, wherein the splice connector includes a first planar side and a second planar side.

13. The system of claim 1, wherein the splice connector includes a first planar side and a second planar side; wherein the first planar side and the second planar side are configured and arranged to facilitate separation of two halves of a mold used to form the splice connector.

14. The system of claim 1, wherein the splice connector includes a first planar side and a second planar side; wherein the first planar side and the second planar side are positioned on opposite sides of the splice connector.

15. The system of claim 1, wherein the splice connector includes a hollow interior, wherein the hollow interior includes one or more support members configured to oppose compressive forces exerted on an external surface of the splice connector.

16. The system of claim 1, wherein the splice connector includes a hollow interior, wherein the hollow interior includes one or more support members configured to prevent deformation of the splice connector.

17. The system of claim 1, wherein the splice connector includes one or more support members configured to resist bending of the splice connector.

18. The system of claim 1, wherein the splice connector includes one or more support members extending outward from a center axis of the splice connector.

19. The system of claim 1, wherein the splice connector includes a compressible section.

20. The system of claim 1, wherein the splice connector includes a cutout in an external surface of the splice connector.

21. The system of claim 1, wherein the splice connector includes a tapered portion.

22. The system of claim 1, wherein the support rod includes a second splice connector configured and arranged to operably connect a third segment to the first segment or to the second segment.

23. A drapery system, comprising:

a support rod;

wherein the support rod is an elongated tube having a generally cylindrical exterior surface extending between an opposing first end and a second end;

wherein the support rod includes a first segment extending from the first end to an intermediate point;

wherein the support rod includes a second segment extending from the intermediate point to the second end;

wherein the first segment of the support rod has a first helical recess on an exterior surface of the first segment of the support rod;

wherein the first segment of the support rod has a first helical protrusion on an interior surface of the first segment of the support rod;

wherein the first helical recess is aligned with the first helical protrusion along a first helical path of the first helical protrusion;

wherein the second segment of the support rod has a second helical recess on an exterior surface of the second segment of the support rod;

wherein the second segment of the support rod has a second helical protrusion on an interior surface of the second segment of the support rod;

wherein the second helical recess is aligned with the second helical protrusion along a second helical path of the second helical protrusion;

wherein the support rod includes a splice connector configured and arranged to operably connect the first segment to the second segment at the intermediate point;

wherein the splice connector is configured to engage the first helical protrusion of the first segment and engage the second helical protrusion of the second segment to secure the connection between the first segment to the second segment at the intermediate point;

a plurality of ring members;

wherein the plurality of ring members are configured and arranged to attach at and/or near an upper edge of a shade material and suspend the shade material from the support rod;

wherein one or more rings of the plurality of ring members are configured to engage with the first helical recess and/or second helical recess in a manner causing the one or more rings to:

move the shade material laterally to a closed position in response to rotation of the support rod in a first direction; and move the shade material laterally to an open position in response to rotation of the support rod in a second direction.

24. The system of claim 23, wherein the splice connector has an elongated generally cylindrical shape having:

a first section configured to connect with the first segment; and a second section configured to connect with the second segment;

wherein the first section has an external surface having one or more features configured to engage the first helical protrusion of the interior surface of the first segment; and wherein the second section has an external surface having one or more features configured to engage the second helical protrusion of the interior surface of the second segment.

25. The system of claim 23, wherein the splice connector has an elongated generally cylindrical shape having:

a first section configured to connect with the first segment; and a second section configured to connect with the second segment;

wherein the first section has an external surface having one or more features configured to engage the first helical protrusion of the interior surface of the first segment; and wherein the second section has an external surface having one or more features configured to engage the second helical protrusion of the interior surface of the second segment;

wherein the first section of the splice connector and the second section of the splice connector have smooth side sections to permit the splice connector to be formed in and removed from a mold.

26. The system of claim 23, wherein the splice connector has an elongated generally cylindrical shape having:

a first section configured to connect with the first segment; and a second section configured to connect with the second segment;

wherein the first section has an external surface having one or more features configured to engage the first helical protrusion of the interior surface of the first segment; and wherein the second section has an external surface having one or more features configured to engage the second helical protrusion of the interior surface of the second segment;

wherein the first section of the splice connector and the second section of the splice connector have planar side sections to permit the splice connector to be formed in and removed from a mold.

* * * * *